United States Patent
Maeda

(10) Patent No.: US 8,958,706 B2
(45) Date of Patent: Feb. 17, 2015

(54) COHERENT OPTICAL COMMUNICATION DEVICE AND METHOD

(75) Inventor: Takuji Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 13/012,870

(22) Filed: Jan. 25, 2011

(65) Prior Publication Data

US 2011/0188866 A1 Aug. 4, 2011

(30) Foreign Application Priority Data

Jan. 29, 2010 (JP) ................................. 2010-19648

(51) Int. Cl.
*H04B 10/06* (2011.01)
*H04B 10/02* (2011.01)

(52) U.S. Cl.
USPC ............ 398/204; 398/162; 398/202; 398/209

(58) Field of Classification Search
USPC .................... 398/202, 204, 162, 140
See application file for complete search history.

(56) References Cited

U.S. PATENT DOCUMENTS

| | | | | |
|---|---|---|---|---|
| 5,121,241 | A * | 6/1992 | Veith | 398/139 |
| 5,301,053 | A * | 4/1994 | Shikada | 398/72 |
| 5,400,167 | A * | 3/1995 | Suemura | 398/209 |
| 6,101,014 | A * | 8/2000 | Majima | 398/69 |
| 2007/0071456 | A1 * | 3/2007 | Chen et al. | 398/204 |
| 2007/0154221 | A1 * | 7/2007 | McNicol et al. | 398/135 |
| 2007/0269160 | A1 * | 11/2007 | Handelman | 385/14 |
| 2010/0111544 | A1 * | 5/2010 | Oda et al. | 398/204 |
| 2010/0278526 | A1 * | 11/2010 | Duan et al. | 398/5 |

FOREIGN PATENT DOCUMENTS

| | | |
|---|---|---|
| JP | 04-335724 | 11/1992 |
| JP | 05-91052 | 4/1993 |
| JP | 08-70293 | 3/1996 |
| JP | 2002-280962 A | 9/2002 |
| JP | 2005-286736 | 10/2005 |
| JP | 2005286736 A * | 10/2005 |
| JP | 2006-186538 | 7/2006 |

OTHER PUBLICATIONS

Tsumato English Translation.*
Japanese Office Action mailed Nov. 5, 2013 for corresponding Japanese Application No. 2010-019648, with partial English-language translation.
Japanese Office Action mailed Feb. 12, 2014 for corresponding Japanese Application No. 2010-019648, with partial English-language translation.

* cited by examiner

*Primary Examiner* — Oommen Jacob
(74) *Attorney, Agent, or Firm* — Fujitsu Patent Center

(57) ABSTRACT

A coherent optical communication device includes a demodulator configured to demodulate a reception signal; a local oscillator light optical source configured to generate local oscillator light used for demodulating the reception signal; a memory configured to store wavelength information; and a controller configured to control the local oscillator light optical source when the demodulator cannot receive the reception signal, so that a wavelength of the local oscillator light generated in the local oscillator light optical source is changed to a wavelength specified by the wavelength information stored in the memory.

4 Claims, 25 Drawing Sheets

FIG. 15A

| TEMPERATURE | CURRENT [mA] |
|---|---|
| 28.8 | 150.2 |
| 27.5 | 161.3 |
| 26.6 | 159.1 |
| 30.2 | 155.8 |
| ...... | ...... |
| ...... | ...... |
| ...... | ...... |
| 29 | 162 |
| 28.4 | 152.9 |

| CURRENT [mA] |
|---|
| 150.2 |
| 155 |
| 160.3 |
| 165.4 |
| ...... |
| ...... |
| ...... |
| 210.5 |
| 215.3 |

| CH NO. | WAVELENGTH | TEMPERATURE [°C] | CURRENT [mA] | OUTPUT VALUE [dBm] |
|---|---|---|---|---|
| 1 | 1524.89 | 28.8 | 150.2 | 9.5 |
| 2 | 1525.66 | 27.5 | 161.3 | 9.5 |
| 3 | 1526.44 | 26.6 | 159.1 | 9.5 |
| 4 | 1527.22 | 30.2 | 155.8 | 9.5 |
| ...... | | | | |
| ...... | | | | |
| ...... | | | | |
| 55 | 1569.59 | 29.0 | 162.0 | 9.4 |
| 56 | 1570.42 | 28.4 | 152.9 | 9.4 |

FIG. 17B

| CH NO. | WAVELENGTH | TEMPERATURE [°C] | CURRENT [mA] | OUTPUT VALUE [dBm] |
|---|---|---|---|---|
| 1 | 1524.89 | 26.0 | 180.6 | 12.6 |
| 2 | 1525.66 | 28.0 | 161.3 | 12.5 |
| 3 | 1526.44 | 24.9 | 179.6 | 12.6 |
| 4 | 1527.22 | 22.3 | 166.7 | 13.4 |
| ...... | | | | |
| ...... | | | | |
| ...... | | | | |
| 55 | 1569.59 | 24.3 | 182.3 | 12.5 |
| 56 | 1570.42 | 25.3 | 185.3 | 12.6 |

FIG. 21

| LOSS FACTOR | VALUE [dB] | ROUTE A | ROUTE B | REMARKS |
|---|---|---|---|---|
| CONNECTOR 131 | 0.4 | 0.4 | | LOSS AT REFERENCE WAVELENGTH |
| CONNECTOR 132 | 0.3 | | 0.3 | |
| CONNECTOR 133 | 0.5 | | 0.5 | |
| 2×1 BRANCHING UNIT(a-b) LOSS | 4.3 | | 4.3 | |
| 2×1 SW LOSS (#1-#3) | 2.8 | 2.8 | | |
| 2×1 SW LOSS (#2-#3) | 3.6 | | 3.6 | |
| WAVELENGTH-DEPENDENCY $\lambda 1$ | 0.4 | 0.4 | | — WAVELENGTH-DEPENDENCY ON BASIS OF REFERENCE WAVELENGTH |
| WAVELENGTH-DEPENDENCY $\lambda 5$ | 0.2 | | 0.2 | — WITH RESPECT TO ALL COMPONENTS NOTED ABOVE |
| TOTAL LOSS | | 3.6 | 8.9 | |
| SETUP LD OUTPUT OF EACH OPTICAL SOURCE | | +3.6 | +8.9 | IT IS ASSUMED THAT DEMODULATOR INPUT #3 = 0 dBm |

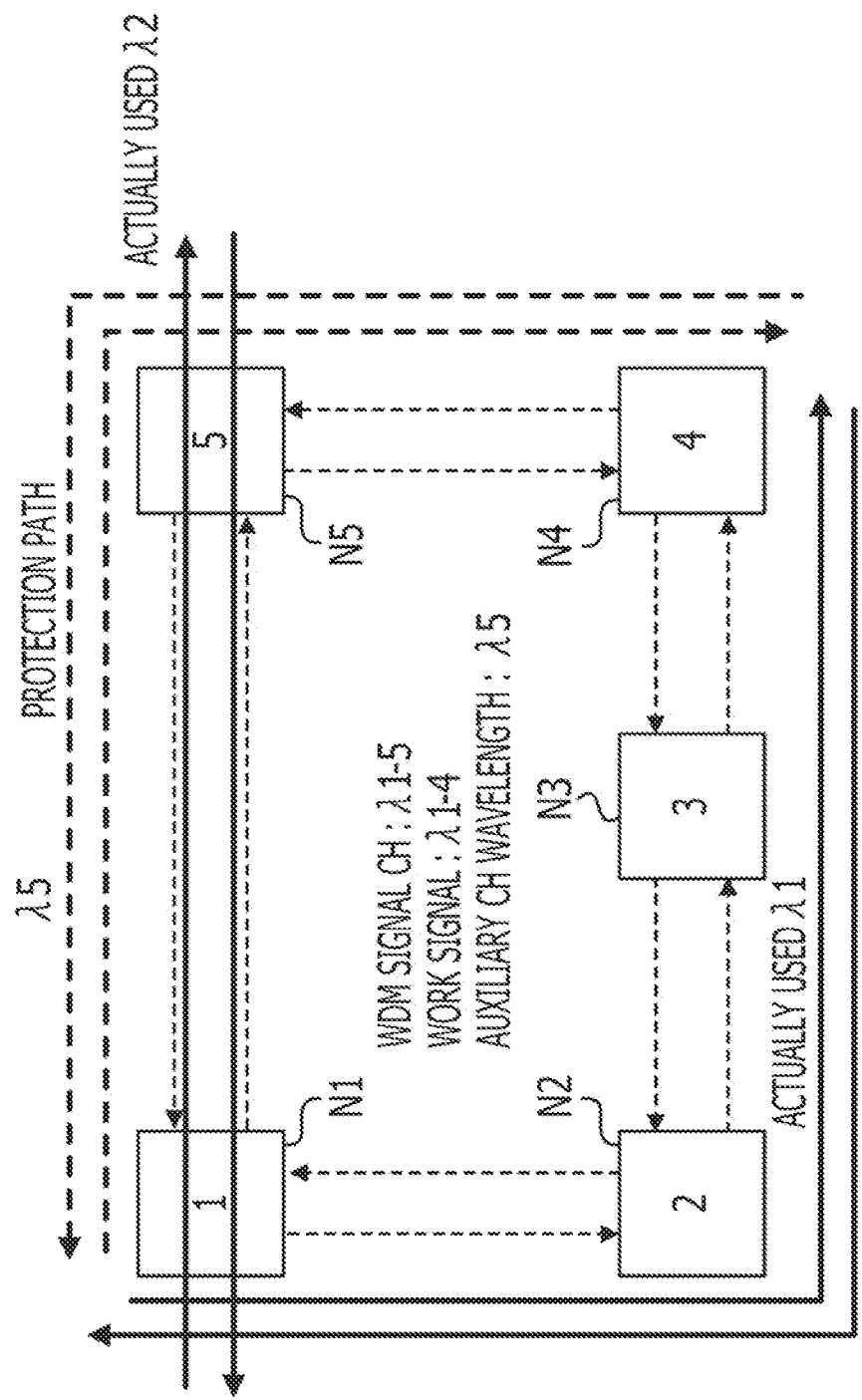

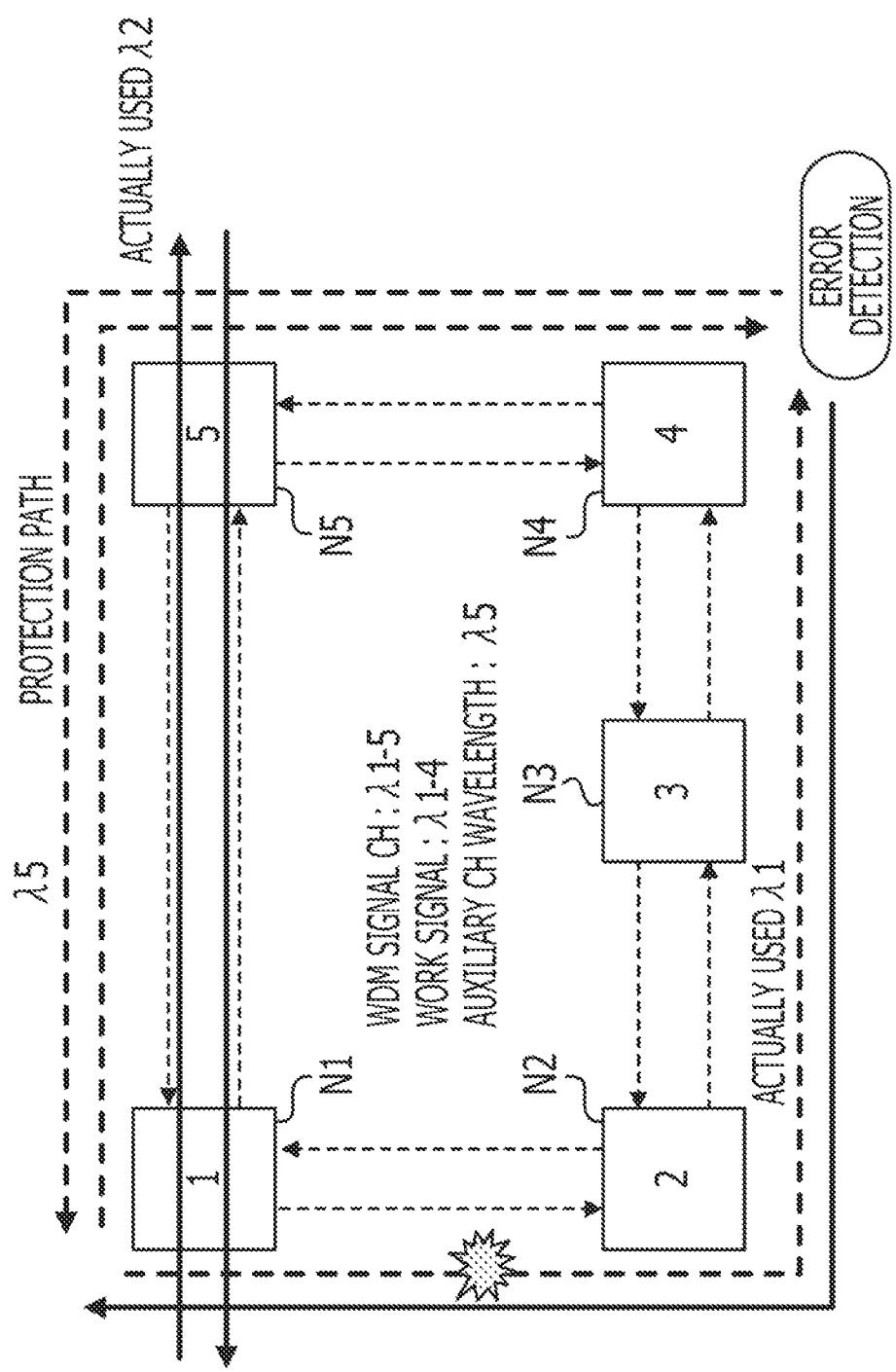

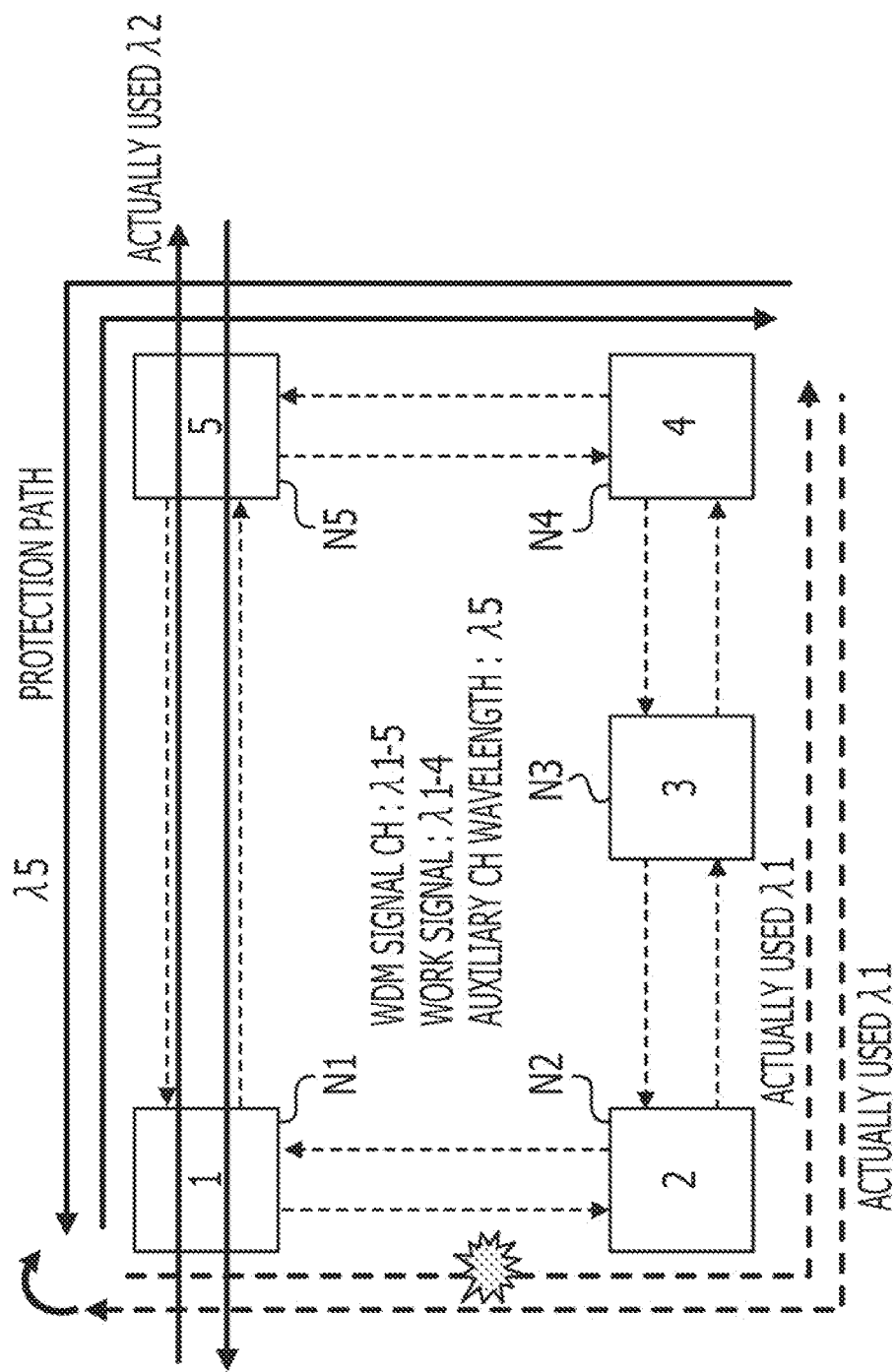

COHERENT OPTICAL COMMUNICATION DEVICE AND METHOD

CROSS-REFERENCE TO RELATED APPLICATION

The present application is based upon and claims the benefit of priority of the prior Japanese Patent Application No. 2010-19648, filed on Jan. 29, 2010, the entire contents of which are incorporated herein by reference.

FIELD

The embodiments discussed herein relate to a coherent optical communication device and a coherent optical communication method, used for wavelength division multiplexing communication.

BACKGROUND

FIG. 1 is a diagram illustrating examples of an optical communication device 11 that performs communication using a wavelength division multiplexed signal, an optical Add/Drop unit 21, a controller 22, and a node controller 23.

The optical communication device 11 includes a demodulator 12, a clock data recovery unit (CDR) 13, and a deframer (DeFramer) 14. The optical communication device 11 includes an electrical/optical converter (E/O) 15, an optical/electrical converter (O/E) 16, a framer (Framer) 17, a driver 18, an intensity modulator 19, and a transmission optical source 20 that is a variable wavelength optical source.

A client signal of 10 Gbit/s output from a client device that is not illustrated in FIG. 1 is converted into an electrical signal by the optical/electrical converter 16, and is converted into a specific frame format by the framer 17. Information relating to a format converted in the framer 17 and the deframer 14 to be hereinafter described is set by the controller 22. A signal converted in the framer 17 is amplified by the driver 18, and is converted into a wavelength division multiplexed signal by the intensity modulator 19 to be output to the optical Add/Drop unit 21. The modulation of a transmission signal performed in the intensity modulator 19 is carried out on the basis of a signal wavelength output from the transmission optical source 20.

The wavelength division multiplexed signal (WDM signal) output from the optical Add/Drop unit 21 is converted into an electrical signal by the demodulator 12, and a clock is extracted in the clock data recovery unit 13. After that, the extraction of header information and the conversion of a signal frame are performed in the deframer 14. After that, the WDM signal is finally converted into an optical signal in the electrical/optical converter 15, and is output to the client device.

In some cases, a line on which a main signal is transmitted is changed from a currently used line to a protection line for the protection of the line. In such a case, by adding change information into the overhead portion of the signal, a receiving side can recognize the change of the line. When a transmitting side and the receiving side have change protocols and perform handshake operations with each other, it is also desirable to add wavelength change information into the overhead portion of a signal and transmit the signal.

Currently, WDM communication is performed using an intensity modulation method, and receivers can receive wideband wavelengths. When an optical Add/Drop device (OADM) or an optical cross connect device (OXC) is used, signal communication (communication) can be performed only by carrying out the changeover of an optical switch such as OADM or the like.

In a coherent optical communication system, there has been a technique in which a signal corresponding to the channel power of a channel wavelength component that passes through an optical filter and a signal corresponding to an ASE noise light component are detected, and an optical signal-to-noise (SN) ratio is calculated on the basis of the detected signals. An example of documents that disclose such a technique is Japanese Laid-open Patent Application Publication No. 2002-280962. Using the technique, the variation of the optical SN ratio can be reduced.

In the coherent optical communication, in a case in which the wavelength of the transmitting side is changed, if the wavelength of local oscillator light in a coherent optical receiver is not matched to the wavelength of the transmitting side, signal communication may not be performed. Therefore, in synchronization with the change of the wavelength of the transmitting side or the switching of the OADM or the like, it is also desirable to change the wavelength of the local oscillator light on the receiving side.

For example, in order to perform wavelength change, it is desirable to transmit, to the receiving side, information used for giving notice of the change of the wavelength using the overhead portion or payload of the main signal. However, unless the wavelength of the local oscillator light of the receiving side is changed to substantially the same wavelength as that of the transmitting side, the receiving side may not know the change of the wavelength. The receiving side may not recognize whether it is difficult to perform communication, owing to the problem of a transmission path or the like, the signal itself is not input, or it is difficult to perform communication, owing to the change of the wavelength.

In order to change the wavelength of a variable wavelength optical source used for the local oscillator light and synchronize the wavelength of the variable wavelength optical source with the wavelength of an optical signal actually input to the receiver, it is desirable to cause the level and wavelength thereof to converge with the wavelength of a target. Therefore, while it is desirable to adjust the wavelength with feedback, it takes time to adjust the wavelength. If a feedback circuit and a monitoring function are provided for feedback, a circuit size and a cost may be increased.

SUMMARY

According to an aspect of an embodiment, a coherent optical communication device includes a demodulator configured to demodulate a reception signal; a local oscillator light optical source configured to generate local oscillator light used for demodulating the reception signal; a memory configured to store wavelength information; and a controller configured to control the local oscillator light optical source when the demodulator cannot receive the reception signal, so that a wavelength of the local oscillator light generated in the local oscillator light optical source is changed to a wavelength specified by the wavelength information stored in the memory.

The object and advantages of the invention will be realized and attained by at least the features, elements, and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 15A and 15B are diagrams illustrating examples of parameter data of an optical source controller;

FIGS. 17A and 17B are diagrams illustrating other examples of parameter data of the optical source controller;

FIG. 21 is a diagram illustrating total losses that includes a loss of an optical element and a loss of a route;

FIG. 22 is a diagram illustrating an example of a WDM network; and

FIGS. 23A to 23C are diagrams illustrating examples of wavelength change methods performed at the time of a failure occurrence.

DESCRIPTION OF EMBODIMENTS

Figure 1:
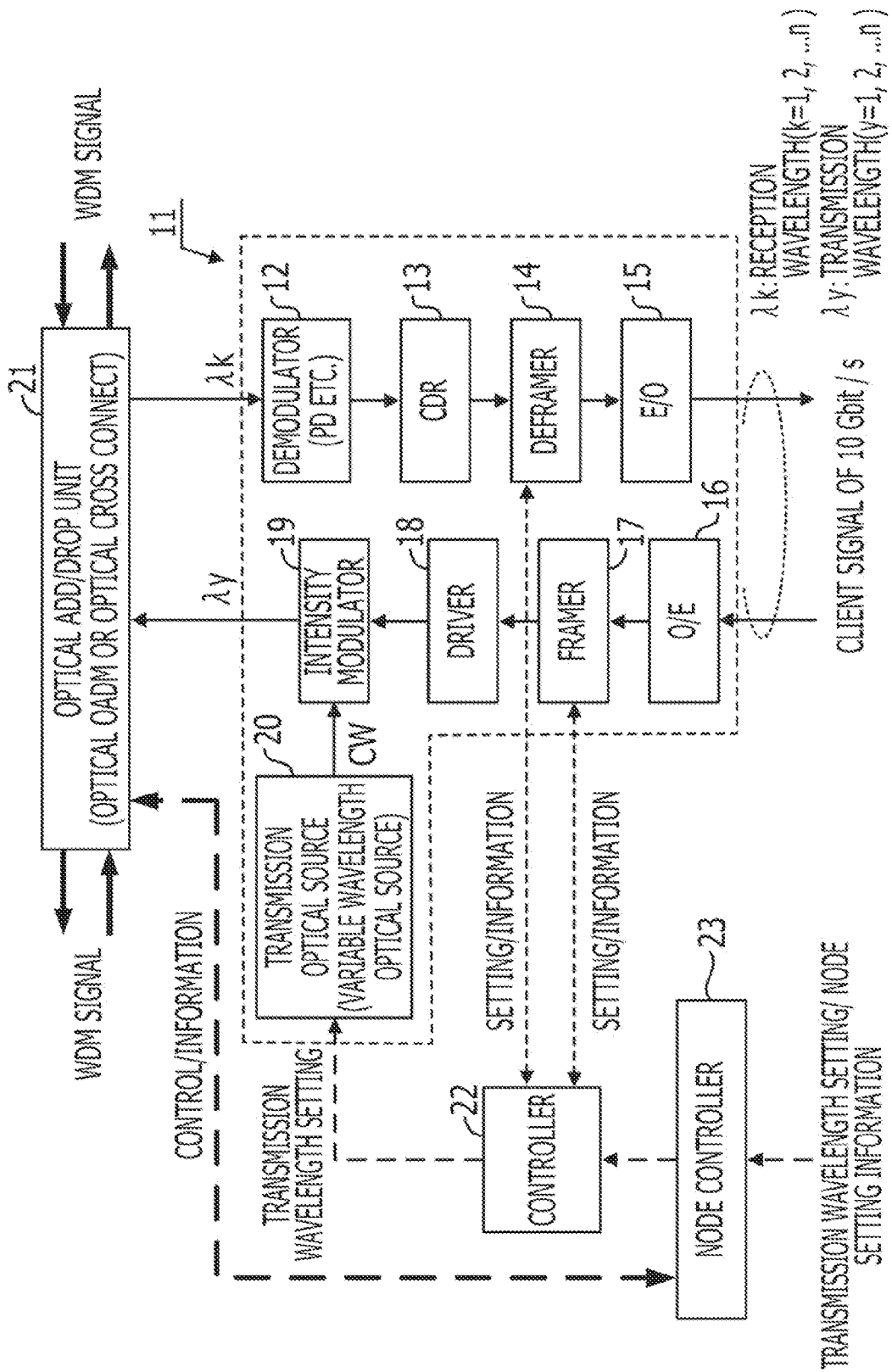
FIG. 1 is a diagram illustrating an example of an optical communication device.
Figure 2:
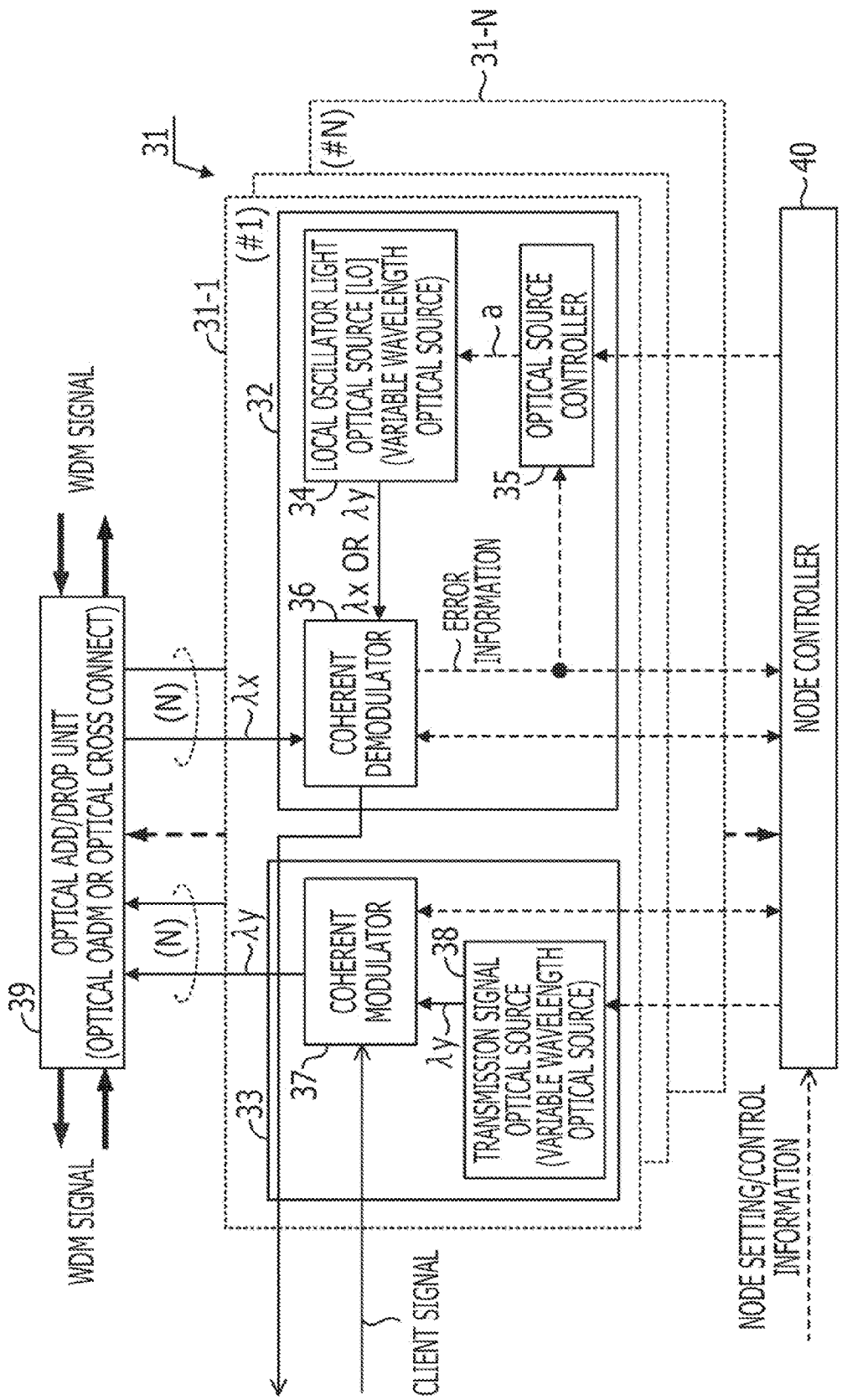
FIG. 2 is a diagram illustrating an example of a coherent optical communication device in a first embodiment.

FIG. 2 is a diagram illustrating an example of a coherent optical communication device 31 in a first embodiment. The coherent optical communication device 31 includes coherent optical transceivers 31-1 to 31-N used for a plurality of channels. Each of the coherent optical transceivers 31-1 to 31-N includes a coherent optical receiver 32 and a coherent optical transmitter 33. For example, QPSK (quadrature phase shift keying), PSK (phase shift keying), or the like may be used as a modulation method for the coherent optical transceiver. For example, homodyne detection, heterodyne detection, intradyne detection, or the like may be used as a detection method.

In FIG. 2, $\lambda x$, $\lambda y$, and $\lambda k$ indicate a reception signal wavelength, a transmission signal wavelength, and the wavelength of a protection channel, respectively.

The coherent optical receiver 32 includes a local oscillator light optical source 34, an optical source controller 35, and a coherent demodulator 36.

The local oscillator light optical source 34 is a variable wavelength optical source. In addition, the wavelength of local oscillator light generated therein is variably controlled by the optical source controller 35, and the local oscillator light optical source 34 outputs a continuous wave (CW) the wavelength of which is the same as that of a coherent modulated light input to the coherent demodulator 36. For example, the variable wavelength optical source is a semiconductor laser such as a distributed feedback laser (DFB) or the like.

On the basis of the local oscillator light output from the local oscillator light optical source 34, the coherent demodulator 36 detects and demodulates a coherent modulated signal (reception signal) output from the optical Add/Drop unit 39. The coherent demodulator 36 determines whether or not there is an error in the reception signal input from the optical Add/Drop unit 39, and outputs error information to the optical source controller 35 and the node controller 40 when the error is detected. The coherent demodulator 36 transmits and receives control information to and from the node controller 40.

For example, the optical source controller 35 is a circuit that sets and controls the wavelength of the output light of the local oscillator light optical source 34. The optical source controller 35 outputs, to the local oscillator light optical source 34, setting information a used for setting the wavelength thereof.

When receiving the error information from the coherent demodulator 36, the optical source controller 35 changes the wavelength of the local oscillator light generated in the local oscillator light optical source 34 to a predetermined wavelength (for example, protection channel wavelength $\lambda k$). The optical source controller 35 includes a storage unit such as a memory or the like. For example, the wavelength information of some channels or all channels used for communication, the wavelength information of a protection channel (changeover destination channel), information relating to the power levels of individual wavelengths are stored in the storage unit. The information relating to the power levels may be included in the wavelength information.

Since the node controller 40 receives the error information from the coherent demodulator 36, the node controller 40 can instruct the optical source controller 35 to change the wavelength of the local oscillator light. In such a case, the node controller 40 instructs the optical source controller 35 to change the wavelength, and the optical source controller 35 can change the wavelength of the local oscillator light in the local oscillator light optical source 34 on the basis of the content of the instruction. Alternatively, the node controller 40 can directly change the wavelength of the local oscillator light in the local oscillator light optical source 34. In this case, the coherent optical transceiver 31-1 can also autonomously change the wavelength without receiving wavelength information, which relates to a changeover destination channel, from another communication device.

The coherent optical transmitter 33 includes a coherent modulator 37 and a transmission signal optical source 38. Using light output from the transmission signal optical source 38, the coherent modulator 37 modulates a client signal output from a client device, not illustrated in FIG. 2, and outputs a modulated coherent signal to the optical Add/Drop unit 39.

The transmission signal optical source 38 is a variable wavelength optical source that generates an optical signal used for modulating a transmission signal, and the wavelength of the output light thereof is controlled by the node controller 40.

When receiving the error information from the coherent demodulator 36, the node controller 40 changes the wavelength of the optical signal generated in the transmission signal optical source 38 to a predetermined wavelength (for example, wavelength λk) for a protection channel. The coherent modulator 37 modulates the client signal using the optical signal output from the transmission signal optical source 38, the wavelength of which is λk, and outputs the modulated client signal.

As described above, when detecting an error in the reception signal, the coherent optical transceiver 31-1 can autonomously change the wavelengths of the local oscillator light and the transmission signal to the wavelength for the protection channel.

Figure 3:
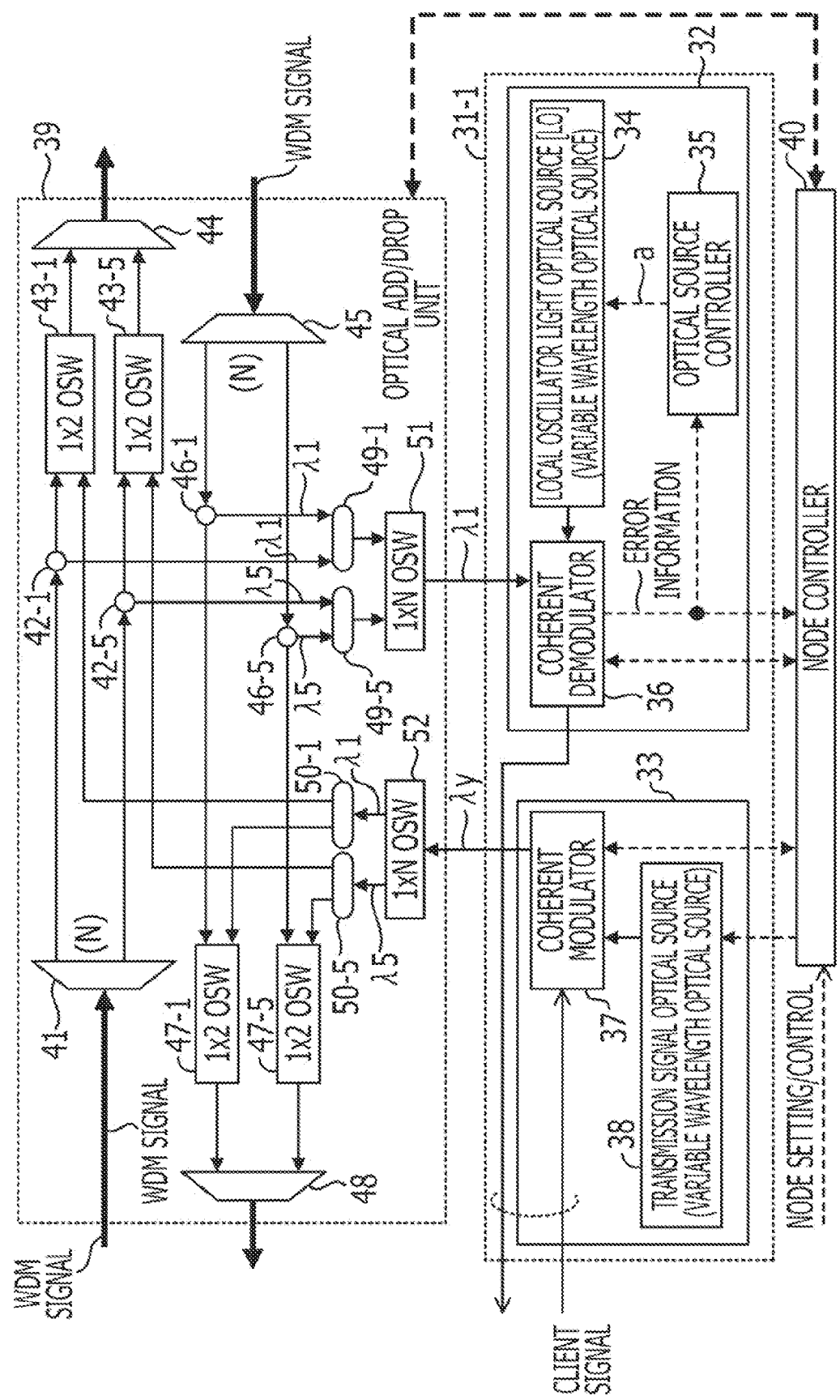
FIG. 3 is a diagram illustrating an example of an optical node in the first embodiment.

FIG. 3 is a diagram illustrating an example of an optical node in the first embodiment. For ease of description, the optical Add/Drop unit 39, one coherent optical transceiver 31-1, and a node controller 40 are illustrated in FIG. 3. Hereinafter, the same symbol is assigned to the same block as that in FIG. 2, and the description thereof will be omitted.

The optical Add/Drop unit 39 includes a wavelength multiplexer 41 into which a wavelength division multiplexed signal (WDM signal) on an uplink side is input, 1×2 optical splitters 42-1 and 42-5, each of which divides an input signal into two branches, 1×2 optical switches 43-1 and 43-5, and a wavelength multiplexer 44. The uplink side indicates the flow of a signal that flows from the left side to the right side with respect to an anterior view of FIG. 3. The 1×2 optical switches 43-1 and 43-5 are optical switches, each of which selects one of two input signals. The wavelength multiplexer 44 multiplexes optical signals for N wavelengths and outputs the multiplexed optical signals as a WDM signal.

In FIG. 3, only the two 1×2 optical splitters 42-1 and 42-5 that correspond to λ1 and λ5, respectively, and the two 1×2 optical switches 43-1 and 43-5 are illustrated. Actually, N 1×2 optical splitters 42-1 to 42-N and N 1×2 optical switches 43-1 to 43-N are provided. Substantially the same description is also applied to the circuit of a downlink side described later.

The optical Add/Drop unit 39 includes a wavelength demultiplexer 45 into which a wavelength division multiplexed signal on the downlink side is input, 1×2 optical splitters 46-1 and 46-5, each of which divides an input signal into two branches, 1×2 optical switches 47-1 and 47-5, and a wavelength multiplexer 48. The downlink side indicates the flow of a signal that flows from the right side to the left side with respect to the anterior view of FIG. 3.

The optical Add/Drop unit 39 includes an interface unit to the coherent transceiver 31-1. The interface unit on an output side includes 2×1 couplers 49-1 and 49-5 that couple two optical signals on the uplink side and downlink side, the wavelengths of which are the same, with each other and a 1×N optical switch 51 that selects and outputs one from among N inputs to the coherent optical transceiver 31-1. The interface unit on an input side includes a 1×N optical switch 52 that outputs the optical signal input from the coherent optical transceiver 31-1 to one of N output destinations and 1×2 optical splitters 50-1 and 50-5, each of which divides the optical signal into two branches.

Hereinafter, a case will be described in which the wavelength of a currently operated channel is changed from a wavelength λ1 to a wavelength λ5 for the protection channel.

The wavelength division multiplexed signal on the uplink side is demultiplexed into optical signals for N wavelengths in the wavelength demultiplexer 41, and each of the optical signals is divided into two branches in each of the 1×2 optical splitters 42-1 to 42-N. One of the two branches into which the optical signal is divided in the 1×2 optical splitters 42-1, the wavelength of which is λ1, is input to the 1×2 optical switch 43-1, and the other of the two branches is input to the 1×2 coupler 49-1. In substantially the same way, one of the two branches into which the optical signal is divided in the 1×2 optical splitters 42-5, the wavelength of which is λ5, is input to the 1×2 optical switch 43-5, and the other of the two branches is input to the 1×2 coupler 49-5.

The 2×1 coupler 49-1 couples the optical signal divided into two branches in the 1×2 optical splitters 42-1 on the uplink side, the wavelength of which is λ1, with the optical signal divided into two branches in the 1×2 optical splitters 46-1 on the downlink side, the wavelength of which is λ1, and outputs the coupled optical signal to the 1×N optical switch 51.

The 2×1 coupler 49-5 couples the optical signal divided into two branches in the 1×2 optical splitters 42-5 on the uplink side, the wavelength of which is λ5, with the optical signal divided into two branches in the 1×2 optical splitters 46-5 on the downlink side, the wavelength of which is λ5, and outputs the coupled optical signal to the 1×N optical switch 51.

The 1×N optical switch 51 selects, at the normal operation thereof, an optical signal in the currently used channel, the wavelength of which is λ1, from among a plurality of optical signals output from the 2×1 couplers 49-1 to 49-N, and outputs the selected optical signal to the coherent optical receiver 32.

When an error in the reception signal is detected in the optical Add/Drop unit 39 or the 1×N optical switch 51 receives the error information from the node controller 40, the 1×N optical switch 51 selects an optical signal output from the 2×1 coupler 49-5, the wavelength of which is the wavelength λ5 for the protection channel, and outputs the selected optical signal to the coherent demodulator 36. Accordingly, when an error occurs, the optical Add/Drop unit 39 can change a channel from the currently used channel to the protection channel (for example, wavelength λ5), and output the optical signal, the wavelength of which is for the protection channel, to the coherent demodulator 36.

Substantially the same description is also applied to an optical signal input from the coherent optical transmitter 33. The 1×N optical switch 52 selects, at the normal operation thereof, the 1×2 optical splitter 50-1 that corresponds to the wavelength λ1, as an output destination for the optical signal output from the coherent modulator 37. When receiving the error information, the 1×N optical switch 54 selects the 1×2 optical splitter 50-5 that corresponds to the wavelength λ5, as an output destination for the output signal of the coherent modulator 37. Accordingly, when an error is detected in the currently operated channel, the optical Add/Drop unit 39 can change the output destination for the output signal of the coherent modulator 37 to the protection channel (for example, wavelength λ5).

The optical Add/Drop unit 39 in FIG. 3 uses the 1×N optical switches 51 and 52, each of which selects one from among N inputs, as an interface to the coherent optical transceiver 31-1. Therefore, an arbitrary vacant channel from among N channels can be used as a protection channel.

Figure 4:
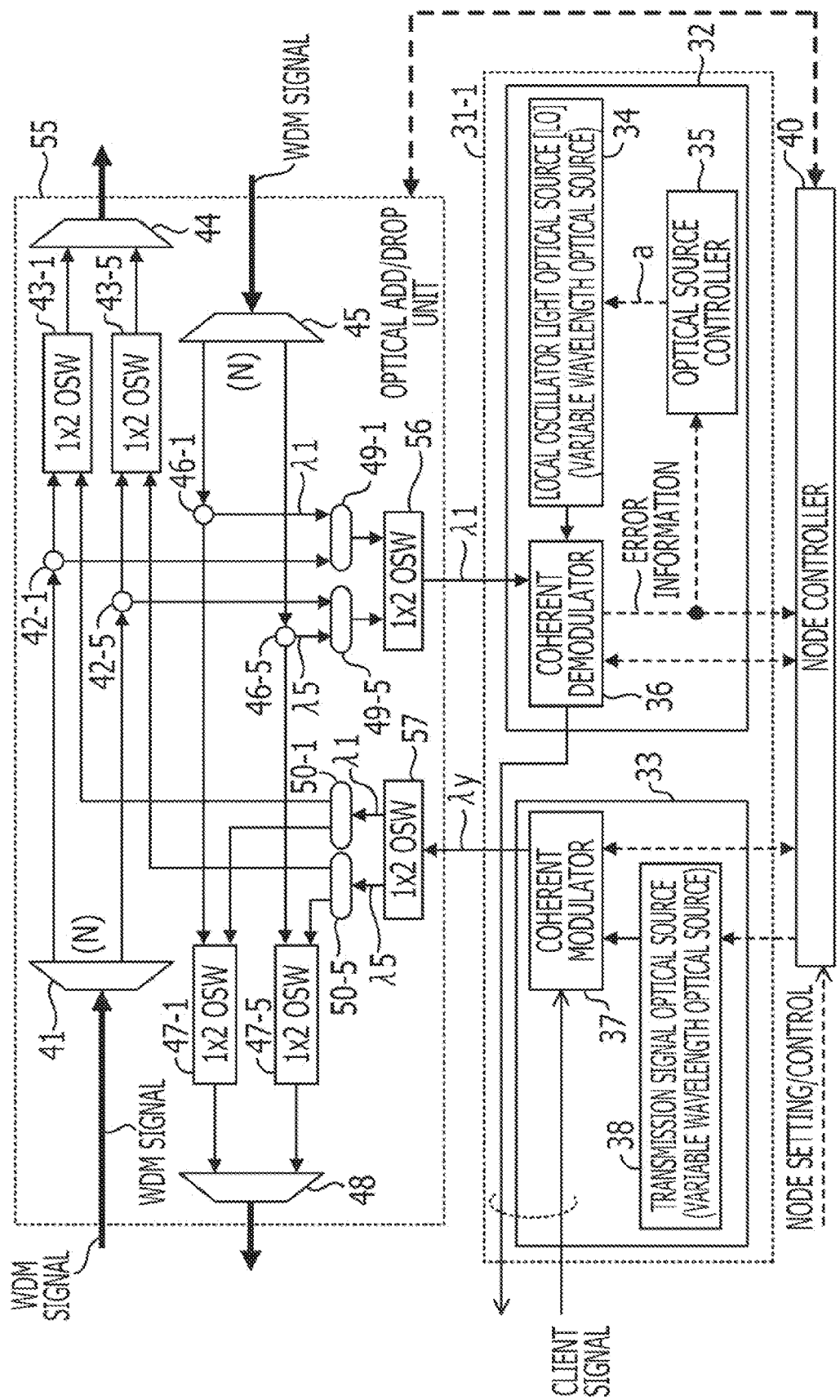
FIG. 4 is a diagram illustrating another example of the optical node in the first embodiment.

FIG. 4 is a diagram illustrating another example of the optical node in the first embodiment. Hereinafter, the same symbol is assigned to the same block as those in FIGS. 2 and 3, and the description thereof will be omitted.

The optical Add/Drop unit 55 in FIG. 4 is different from the optical Add/Drop unit 39 in FIG. 3 in that 1×2 optical switches 56 and 57 are used as an interface portion to the coherent optical transceiver 31-1.

When a currently operated channel and a protection channel are predetermined, the circuit configuration of the optical Add/Drop unit 55 can be simplified using two-input (or two-output) 1×2 optical switches 56 and 57.

According to the first embodiment described above, when a optical signal cannot be received, owing to the failure of an optical line, coherent optical transceivers on the receiving side and the transmitting side can autonomously change each of the wavelengths of local oscillator light and a transmission signal to a predetermined wavelength for a protection channel (changeover destination channel). Accordingly, the coherent optical transceivers on the receiving side and the transmitting side can communicate with each other using the wavelength for the protection channel, and recover the failure in a short time. In addition, since it is not necessary to transmit the wavelength information or the like of a changeover destination channel to the other coherent optical transceiver, a processing operation for obtaining the wavelength information, and hence a processing operation can be simplified. The case where the optical signal cannot be received includes the case where the error more than a regulated frequency is not detected within a certain period.

Figure 5:
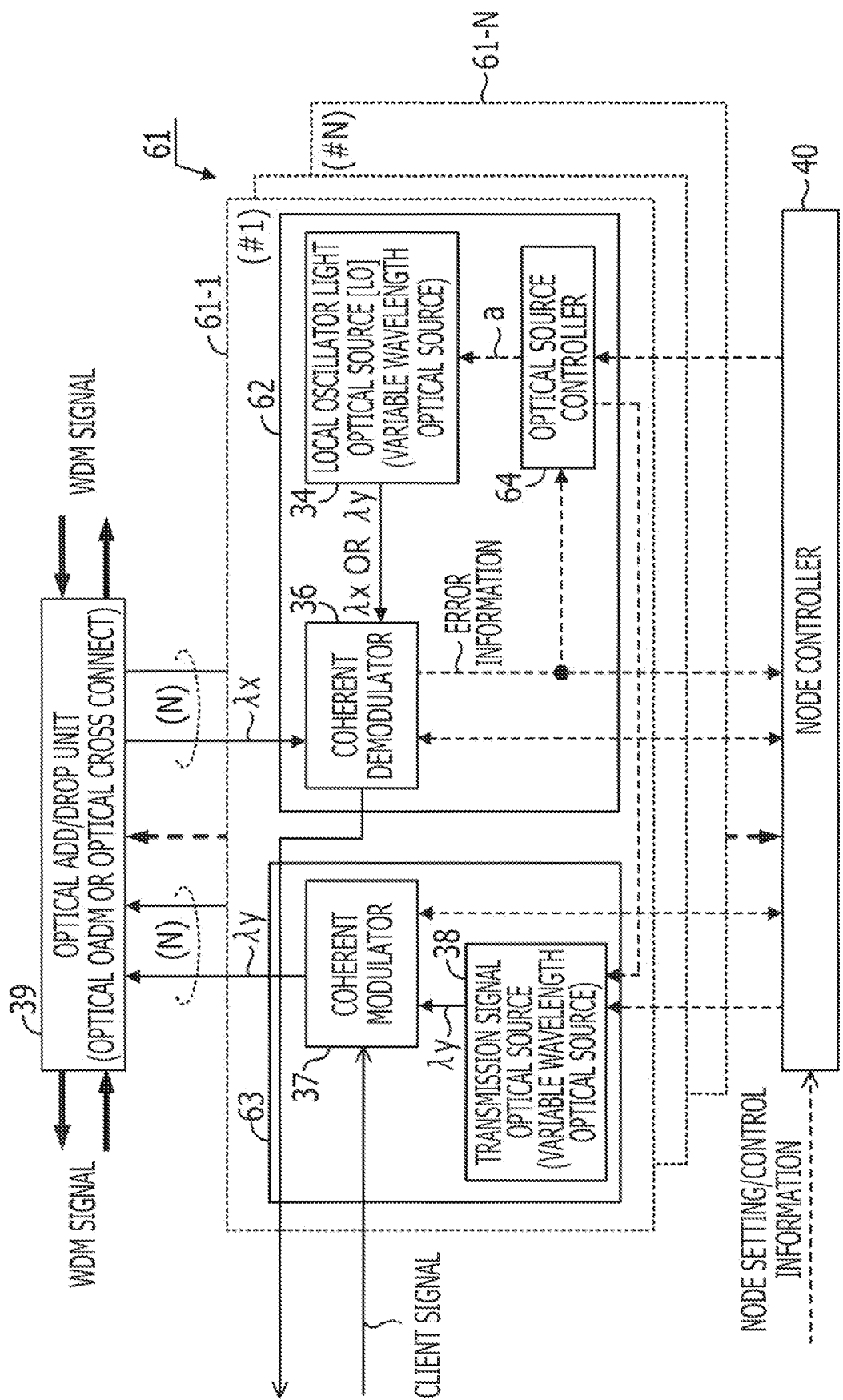
FIG. 5 is a diagram illustrating an example of a coherent optical communication device in a second embodiment.

Next, FIG. 5 is a diagram illustrating an example of a coherent optical communication device 61 in a second embodiment. In FIG. 5, the same symbol is assigned to the same block as that in FIG. 2, and the description thereof will be omitted.

In FIG. 5, the coherent optical communication device 61 includes coherent optical transceivers 61-1 to 61-N for a plurality of channels. Each of the coherent optical transceivers 61-1 to 61-N includes a coherent receiver 62 and a coherent transmitter 63.

The coherent optical communication device 61 in FIG. 5 is characterized in that an optical source controller 64 sets the wavelengths of both the local oscillator light optical source 34 and the transmission signal optical source 38.

When an error is detected in the coherent demodulator 36, the optical source controller 64 and the node controller 40 are notified of error information. When receiving the error information, the optical source controller 64 changes the wavelength of local oscillator light in the local oscillator light optical source 34 to a predetermined wavelength (for example, protection channel wavelength λk). The node controller 40 changes the wavelength of the output light of the transmission signal optical source 38 to the predetermined wavelength (for example, protection channel wavelength λk).

Accordingly, for example, even if the transmitting side changes the wavelength of the optical signal to a predetermined wavelength in response to the occurrence of a failure, the receiving side can resume communication by changing the wavelength of the local oscillator light therein to the same wavelength. In addition, the receiving side can also change the wavelength of a transmission signal to the same wavelength as that in the transmitting side.

According to the second embodiment, when a failure or the like occurs in an optical line, the coherent optical transceivers 61-1 on the receiving side and the transmitting side can autonomously change each of the wavelengths of the local oscillator light and the transmission signal to a predetermined wavelength for a channel. Since one optical source controller 64 performs the change of the wavelengths of the local oscillator light optical source 34 and the transmission signal optical source 38, the circuit configuration of the coherent optical transceiver 61-1 can be simplified.

Figure 6:
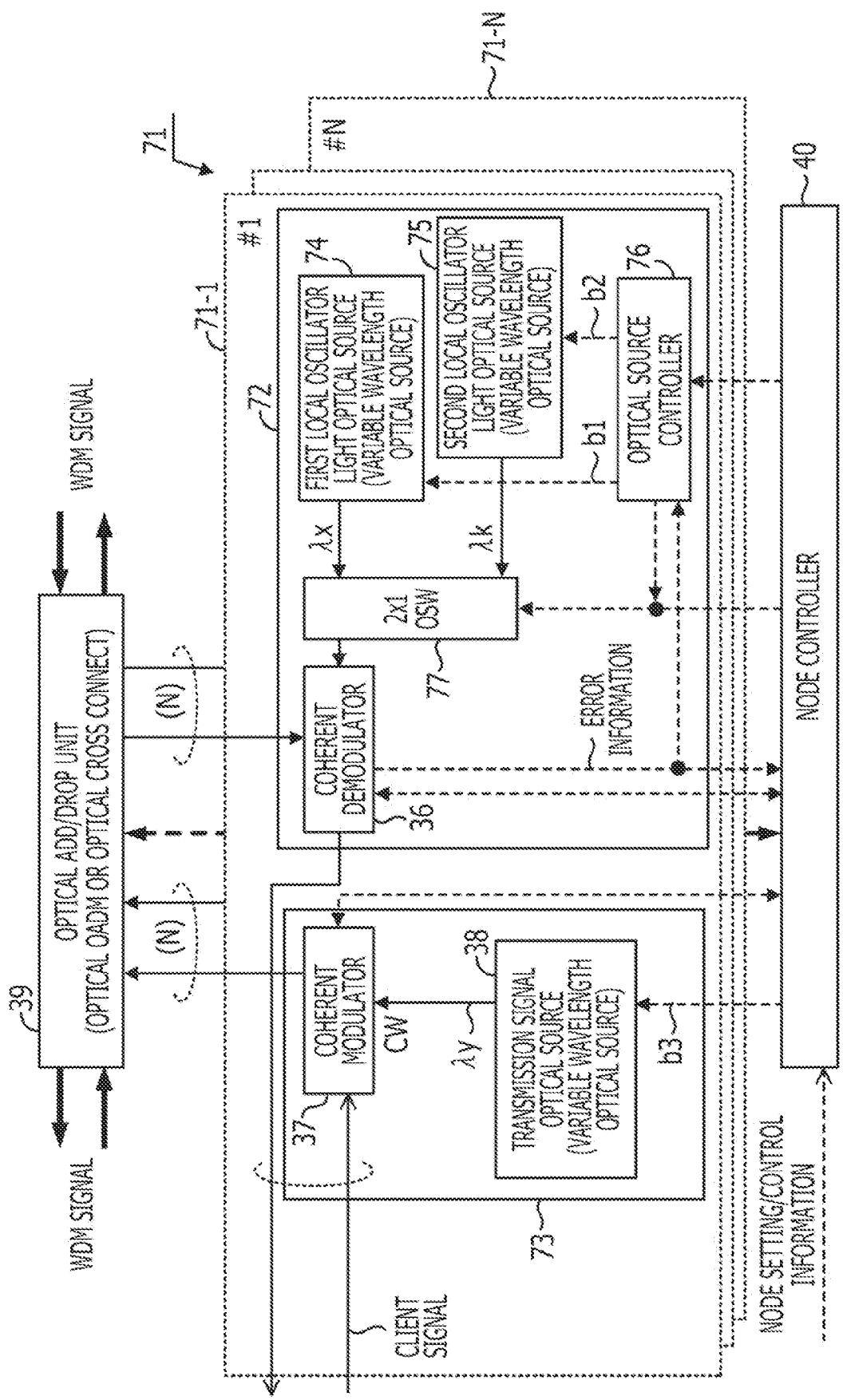
FIG. 6 is a diagram illustrating an example of a coherent optical communication device in a third embodiment.

Next, FIG. 6 is a diagram illustrating an example of a coherent optical communication device 71 in a third embodiment. In FIG. 6, the same symbol is assigned to the same block as that in FIG. 2, and the description thereof will be omitted.

In FIG. 6, the coherent optical communication device 61 includes coherent optical transceivers 71-1 to 71-N for a plurality of channels. Each of the coherent optical transceivers 71-1 to 71-N includes a coherent optical receiver 72 and a coherent optical transmitter 73.

The coherent optical receiver 72 includes a first local oscillator light optical source 74, a second local oscillator light optical source 75, an optical source controller 76, a 2×1 optical switch 77, and a coherent demodulator 36.

The first local oscillator light optical source 74 is a variable wavelength optical source that generates local oscillator light used for demodulating a reception signal. The second local oscillator light optical source 75 is a variable wavelength optical source that generates a local oscillator light for a changeover destination channel. The wavelength of local oscillator light in each of the first local oscillator light optical source 74 and the second local oscillator light optical source 75 is controlled by the optical source controller 76.

The coherent demodulator 36 demodulates, using a local oscillator light selected by the 2×1 optical switch 77, a coherent modulated signal output from the optical Add/Drop unit 39, and outputs the demodulated signal to a client device. When detecting an error in the reception signal, the coherent demodulator 36 outputs error information to the optical source controller 76 and the node controller 40.

The optical source controller 76 performs the setting of the wavelength of local oscillator light in each of the first local oscillator light optical source 74 and the second local oscillator light optical source 75 and changeover control or the like for the 2×1 optical switch 77.

The optical source controller 76 includes a storage unit such as a memory or the like. Wavelength information used for setting the wavelength of local oscillator light in each of the first local oscillator light optical source 74 and the second local oscillator light optical source 75, information used for setting the power level of the local oscillator light, and the like are stored in the storage unit. Using the information stored in the storage unit, the optical source controller 76 outputs setting signals b1 and b2 used for setting the wavelengths of two beams of local oscillator light in the first local oscillator light optical source 74 and the second local oscillator light optical source 75 and the output power levels thereof, respectively.

The optical source controller 76 outputs, at the normal operation thereof (when no error is detected), a selection signal for causing the optical switch 77 to select the output light of the first local oscillator light optical source 74. When the optical source controller 76 receives error information from the coherent demodulator 36, the optical source controller 76 outputs a selection signal for causing the 2×1 optical switch 77 to select the output light of the second local oscillator light optical source 75.

On the basis of the selection signal output from the optical source controller 76, the 2×1 optical switch 77 selects one of the output light of the first local oscillator light optical source 74 and the output light of the second local oscillator optical source 75, and outputs the selected output light to the coherent demodulator 36.

The node controller 40 controls the wavelength of the output light of the transmission signal optical source 38.

When receiving the error information from the coherent demodulator 78, the node controller 40 changes the wavelength of the output light of the transmission signal optical source 38 to a predetermined wavelength (for example, protection channel wavelength λk). At this time, the node controller 40 outputs a setting signal b3 used for setting the wavelength of the signal light of the transmission signal optical source 38. Accordingly, the wavelength of the output light of the transmission signal optical source 38 is changed from λy to a protection channel wavelength λk.

According to the third embodiment, when a failure or the like occurs in an optical line, each of the coherent optical transceivers 81-1 to 81-N on the receiving side and the transmitting side can autonomously change each of the wavelengths of the local oscillator light and the transmission signal to a predetermined wavelength for a channel. Accordingly, the communication between the transmitting side and the receiving side can be resumed. Since the coherent optical receiver 72 includes two optical sources such as the first local oscillator light optical source 74 and the second local oscillator light optical source 75, the wavelength can be changed in a short time at the time of a failure occurrence.

Figure 7:
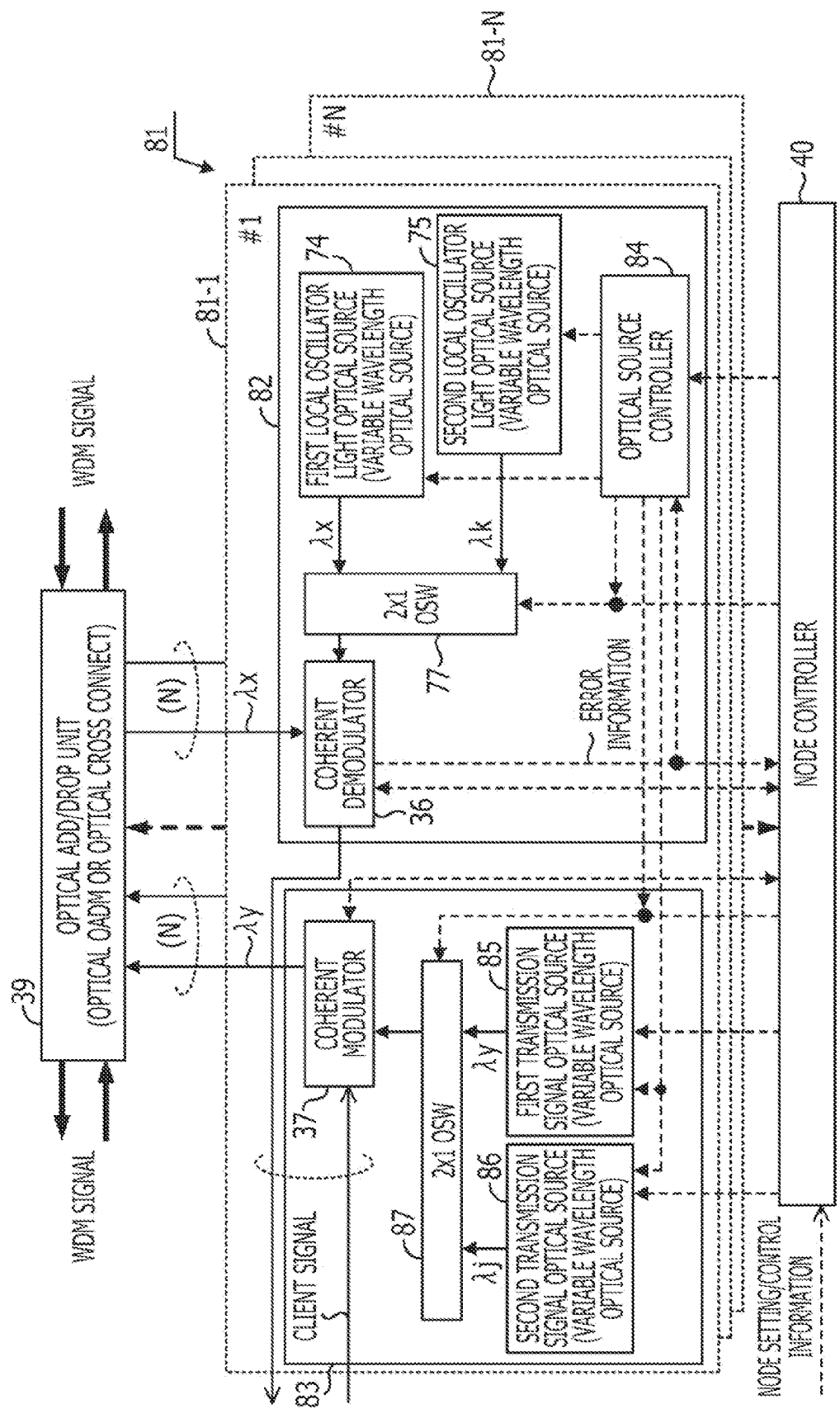
FIG. 7 is a diagram illustrating an example of a coherent optical communication device in a fourth embodiment.

Next, FIG. 7 is a diagram illustrating an example of a coherent optical communication device 81 in a fourth embodiment. In FIG. 7, the same symbol is assigned to the same block as that in FIG. 6, and the description thereof will be omitted.

The coherent optical communication device 81 includes coherent optical transceivers 81-1 to 81-N for a plurality of channels. Each of the coherent optical transceivers 81-1 to 81-N includes a coherent optical receiver 82 and a coherent optical transmitter 83.

The coherent optical receiver 82 includes a first local oscillator light optical source 74, a second local oscillator light optical source 75, an optical source controller 84, a 2×1 optical switch 77, and a coherent demodulator 36.

For example, the first local oscillator light optical source 74 is a variable wavelength optical source that generates local oscillator light used for a currently used channel. For example, the second local oscillator light optical source 75 is a variable wavelength optical source that generates a local oscillator light for a changeover destination channel. The wavelengths of the first local oscillator light optical source 74 and the second local oscillator light optical source 75 are controlled by the optical source controller 84.

The coherent optical transmitter 83 includes a coherent modulator 37, a first transmission signal optical source 85, a second transmission signal optical source 86, and a 2×1 optical switch 87.

For example, the first transmission signal optical source 85 is a variable wavelength optical source that generates the optical signal of a currently used channel, used for modulating a transmission signal. For example, the second transmission signal optical source 86 is a variable wavelength optical source that generates the optical signal of a changeover destination channel. The wavelengths of the first transmission signal optical source 85 and the second transmission signal optical source 86 are controlled by the optical source controller 84.

In accordance with an instruction from the optical source controller 84, the 2×1 optical switch 87 selects one of the output light of the first transmission signal optical source 85 and the output light of the second transmission signal optical source 86, and outputs the selected output light to the coherent modulator 37.

The optical source controller 84 performs the setting of the wavelength of the output light of each of the first local oscillator light optical source 84, the second local oscillator light optical source 85, the first transmission signal optical source 85, and the second transmission signal optical source 86, and changeover control for the 2×1 optical switches 77 and 87.

The optical source controller 86 includes a storage unit such as a memory or the like. Information that indicates the wavelength of local oscillator light in each of the first local oscillator light optical source 74 and the second local oscillator light optical source 75, the power level thereof, and the like are stored in the storage unit. In substantially the same way, the optical source controller 84 stores wavelength setting information used for setting the wavelengths of optical signals generated in the first transmission signal optical source 85 and the second transmission signal optical source 86, information used for setting the power levels of the individual wavelengths, and the like in the storage unit. Using these pieces of information stored in the storage unit, the optical source controller 84 controls the wavelength and output power level of the output light of each of the first local oscillator light optical source 74, the second local oscillator light optical source 75, the first transmission signal optical source 85, and the second transmission signal optical source 86.

The optical source controller 84 outputs, at the normal operation thereof (when no error in a reception signal is detected), a selection signal for causing the 2×1 optical switch 77 to select the output light of the first local oscillator light optical source 74. The optical source controller 86 outputs a selection signal for causing the 2×1 optical switch 87 to select the output light of the first transmission signal optical source 85.

When receiving error information, the optical source controller 84 outputs a selection signal for causing the 2×1 optical switch 77 to select the output light of the second local oscillator light optical source 75. The optical source controller 86 outputs a selection signal for causing the 2×1 optical switch 87 to select the output light of the second transmission signal optical source 86.

Namely, when an error in the reception signal is detected, the 2×1 optical switch 77 in the coherent optical receiver 82 selects the local oscillator light that has the wavelength for the protection channel, and outputs the local oscillator light to the coherent demodulator 36. Accordingly, using the local oscillator light that has the wavelength for the protection channel, the coherent demodulator 36 can demodulate the reception signal. In substantially the same way, the 2×1 optical switch 87 in the coherent optical transmitter 83 selects and outputs light, which has the wavelength for the protection channel, to the coherent modulator 37. Accordingly, the coherent modulator 37 can modulate, using the light that has the wavelength for the protection channel, a client signal, and output the modulated client signal to the optical Add/Drop unit 39.

While, in the example described above, the case has been described in which, when an error in the reception signal is detected, the optical source controller 84 performs the changeover control for the 2×1 optical switches 77 and 87, the node controller 40 may instruct the optical source controller 84 to perform the changeover control for the 2×1 optical switches 77 and 87. Alternatively, the node controller 40 may also directly change the wavelengths of the individual optical sources.

Figure 8:
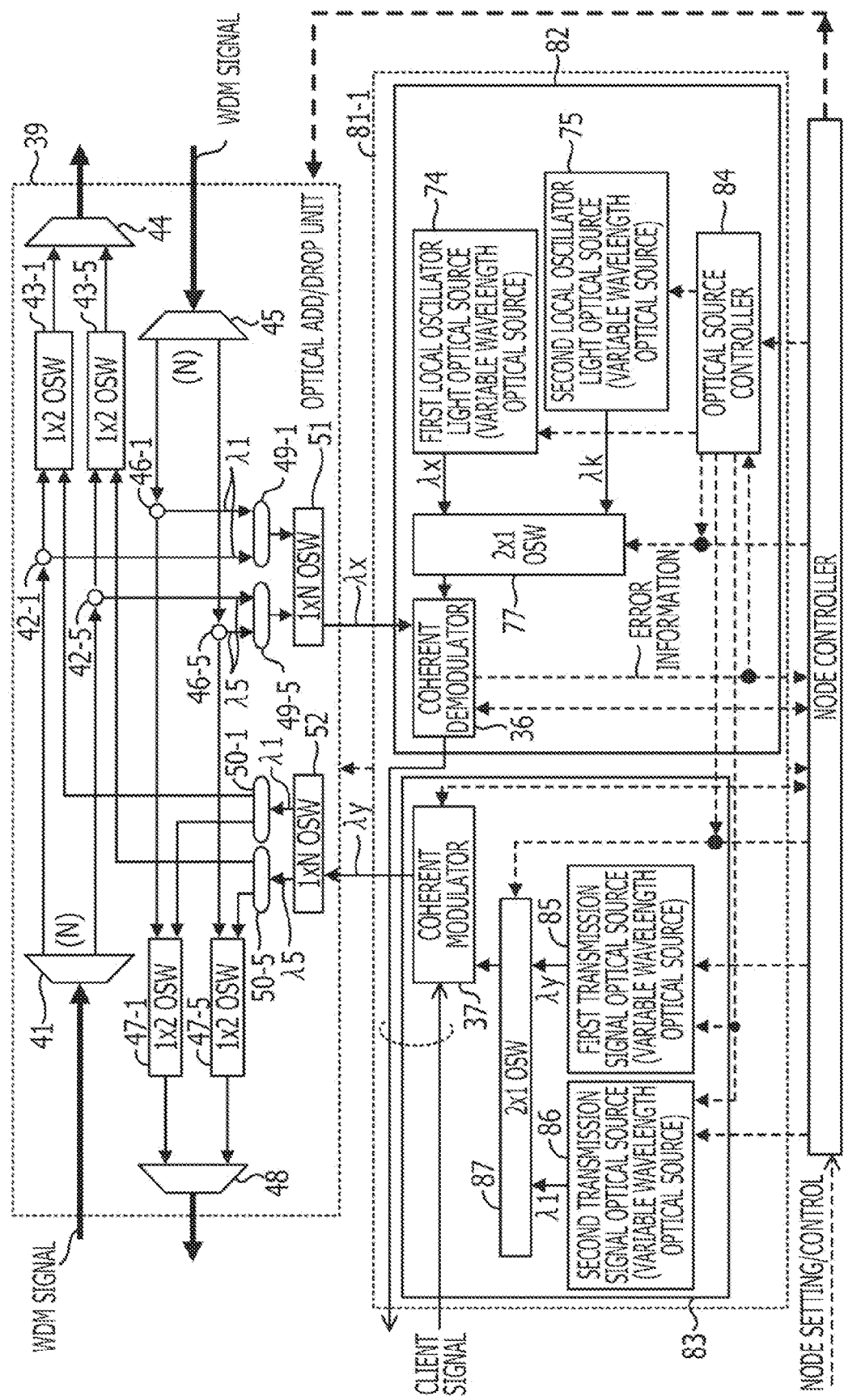
FIG. 8 is a diagram illustrating an example of an optical node in the fourth embodiment.

Next, FIG. 8 is a diagram illustrating an example of an optical node in the fourth embodiment. For ease of description, the optical Add/Drop unit 39, one coherent optical transceiver 31-1, and a node controller 40 are illustrated in FIG. 8.

In FIG. 8, the same symbol is assigned to the same block as those in FIGS. 3 and 7, and the description thereof will be omitted.

The 1×N optical switch 51 in the optical Add/Drop unit 39 selects, at the normal operation thereof, an optical signal in the currently used channel the wavelength of which is λ1, output from the 2×1 couplers 49, and outputs the selected optical signal to the coherent optical receiver 82. When receiving error information, the 1×N optical switch 51 is changed over so as to select an optical signal that has the wavelength λ5 for a protection channel, output from the 2×1 couplers 49-5, and outputs the optical signal the wavelength of which is λ1 to the coherent demodulator 36. Accordingly, when an error in the reception signal is detected, the optical Add/Drop unit 39 can change a channel from the currently used channel to the protection channel (for example, wavelength λ5), and output the optical signal of the protection channel to the coherent demodulator 36.

The optical Add/Drop unit 39 in FIG. 8 includes the 1×N optical switches 51 and 52, each of which selects one from among N inputs, as an interface to the coherent optical transceiver 31-1. Therefore, an arbitrary vacant channel from among N channels can be used as a protection channel.

Figure 9:
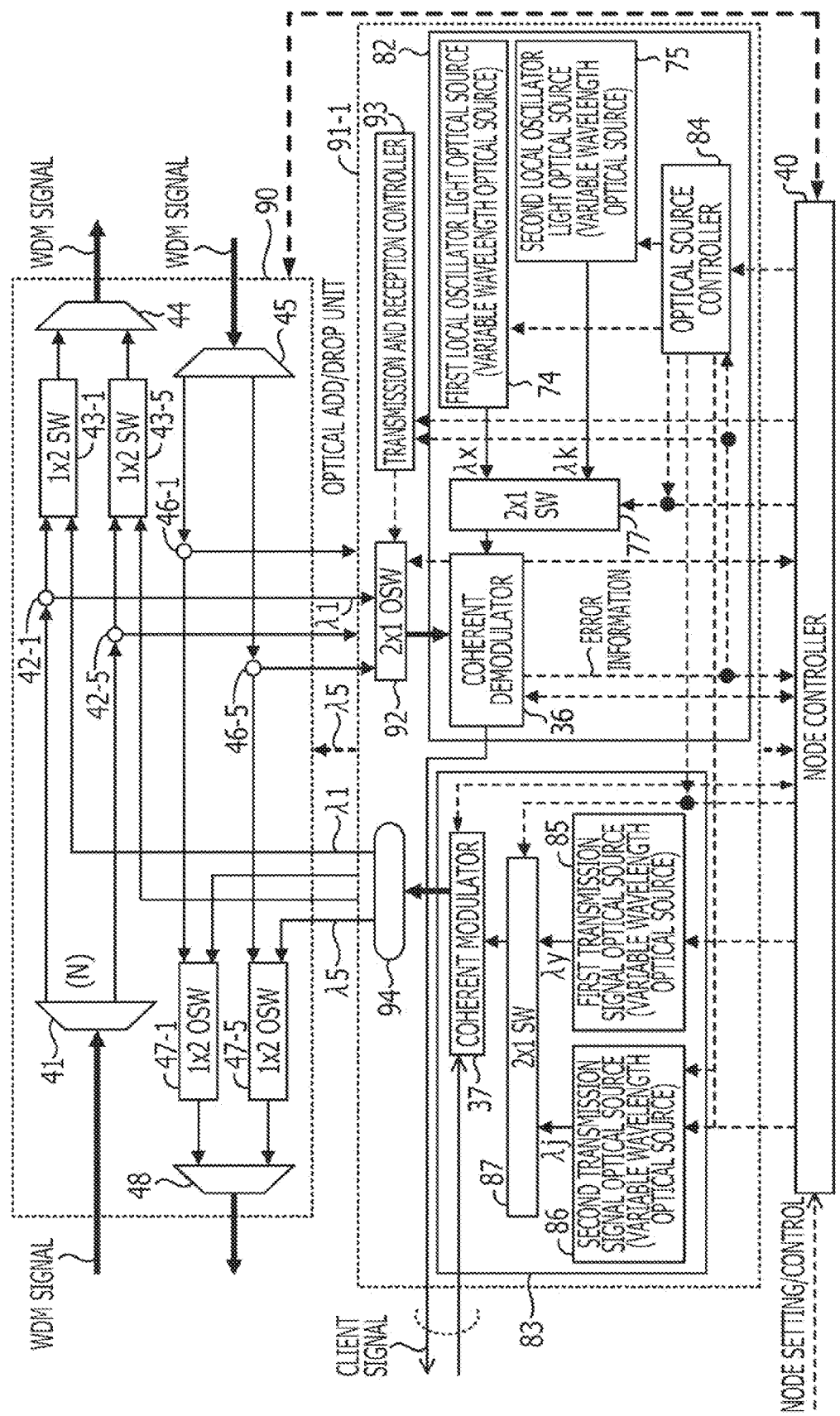
FIG. 9 is a diagram illustrating another example of the optical node in the fourth embodiment.

FIG. 9 is a diagram illustrating another example of the optical node in the fourth embodiment. In the optical node illustrated in FIG. 9, the interface unit that performs the changeover of an output channel as illustrated in FIG. 8 is provided on the coherent optical transceiver side. In the description, hereinafter, the same symbol is assigned to the same block as those in FIGS. 7 and 8, and the description thereof will be omitted.

The optical Add/Drop unit 90 illustrated in FIG. 9 is substantially the same as the optical Add/Drop unit 39 in FIG. 8, except for the interface unit circuit therein.

A coherent optical transceiver 91-1 includes a 2×1 optical switch 92 that functions as an interface unit to the optical Add/Drop unit 90, a transmission and reception controller 93, a 1×2 optical splitter 94, a coherent optical receiver 82, and a coherent optical transmitter 83.

The 2×1 optical switch 92 outputs to the coherent demodulator 36 one of an optical signal that has the wavelength λ1 and an optical signal that has the wavelength λ5 for the protection channel. The changeover of the 2×1 optical switch 92 is performed by the transmission and reception controller 93. In an operation status, the 2×1 optical switch 92 selects the optical signal that has the wavelength λ1, and outputs the optical signal to the coherent demodulator 36.

The 1×2 optical splitter 94 divides an optical signal, output from the coherent demodulator 37, into two branches, and outputs the divided optical signals to a channel, through which the optical signal having the wavelength λ1 is transmitted, and a channel, through which the optical signal having the wavelength λ5 for the protection channel is transmitted, respectively.

When detecting an error in a reception signal, the coherent demodulator 36 outputs error information to the optical source controller 84, the node controller 40, and the transmission and reception controller 93.

When receiving the error information from the coherent demodulator 36, the transmission and reception controller 93 controls the 2×1 optical switch 92 so that the 2×1 optical switch 92 selects the optical signal that has the wavelength λ5. Accordingly, the optical signal that has the wavelength λ5 for the protection channel is output from the 2×1 optical switch 92 to the coherent demodulator 36.

At this time, since, as described above, the 2×1 optical switch 77 selects the output light (for example, local oscillator light that has the wavelength λ5) of the second local oscillator light optical source 75, the coherent demodulator 36 can demodulate the reception signal, using the local oscillator light that has the wavelength λ5.

In substantially the same way, in the coherent modulator 37, the modulation of a client signal is performed using the signal light of the second transmission signal optical source 86, the wavelength of which is λk (for example, wavelength λ5). The output signal of the coherent modulator 37 is delivered to the channel the wavelength of which is λ5.

According to the fourth embodiment described above, even if a failure occurs in an optical line or the like, each of the coherent optical transceivers on the receiving side and the transmitting side can autonomously change each of the wavelengths of the local oscillator light and the transmission signal to a predetermined wavelength for a channel. Accordingly, the communication between the transmitting side and the receiving side can be resumed. For example, by providing the 2×1 optical switch 92, the 1×2 optical splitter 94, and the like in the coherent optical transceiver 91-1, the interface circuit to the optical Add/Drop unit 90 can be realized.

In the fourth embodiment, the coherent optical receiver 82 includes the first local oscillator light optical source 74 and the second local oscillator light optical source 75, and the coherent optical transmitter 83 includes the first transmission signal optical source 85 and the second transmission signal optical source 86. Accordingly, when an error in the reception signal is detected, the wavelengths of the local oscillator light and the transmission signal can be changed to a predetermined channel wavelength in a short time.

Figure 10:
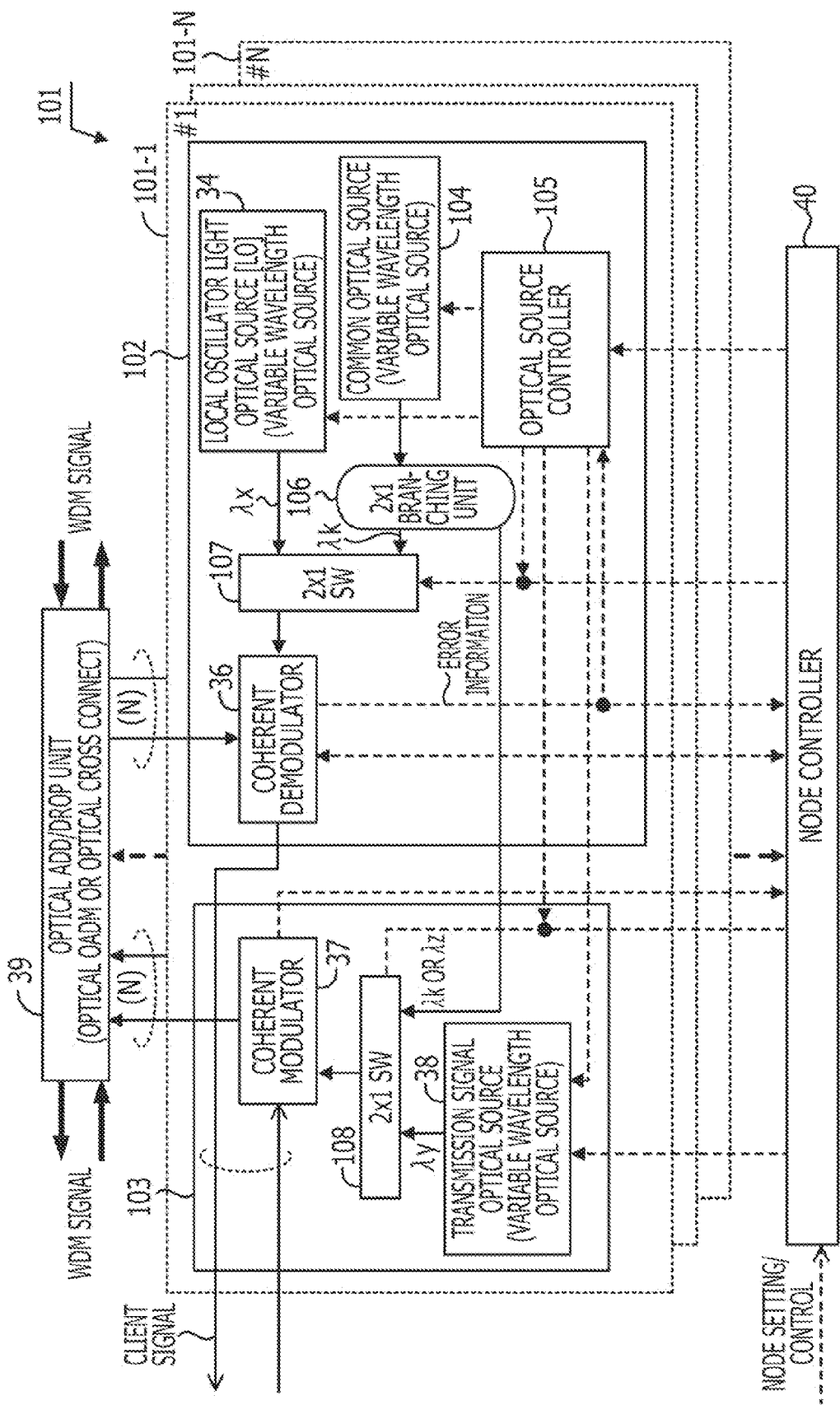
FIG. 10 is a diagram illustrating an example of a coherent optical communication device in a fifth embodiment.

FIG. 10 is a diagram illustrating an example of a coherent optical communication device 101 in a fifth embodiment. In the description, hereinafter, the same symbol is assigned to the same block as that in FIG. 2, and the description thereof will be omitted.

In the fifth embodiment, an optical source that generates protection local oscillator light and an optical source used for a protection transmission signal are integrated into one optical source.

In FIG. 10, the coherent optical receiver 101-1 includes a coherent optical receiver 102 and a coherent optical transmitter 103. The coherent optical receiver 102 includes a local oscillator light optical source 34, a common optical source 104, an optical source controller 105, a 2×1 optical splitter 106, a 2×1 optical switch 107, and a coherent demodulator 36.

The common optical source 104 is a variable wavelength optical source that generates a local oscillator light for a changeover destination channel and an optical signal for the changeover destination channel of a transmission signal when an error in the reception signal is detected. The output light of the common optical source 104 is divided into two branches in the 2×1 optical splitter 106, and is output to the 2×1 optical switch 107 and a 2×1 optical switch 108.

The 2×1 optical switch 107 selects one of local oscillator light output from the local oscillator light optical source 34 and local oscillator light the wavelength of which is λk, output from the common optical source 104, and outputs the selected local oscillator light to the coherent demodulator 36. On the basis of the local oscillator light selected in the 2×1 optical switch 107, the coherent demodulator 36 demodulates coherent modulated light received from the optical Add/Drop unit 39.

The coherent transmitter 103 includes a transmission signal optical source 38, a 2×1 optical switch 108, and a coherent modulator 37.

The 2×1 optical switch 108 selects one of an optical signal the wavelength of which is λy, output from the transmission signal optical source 38, and an optical signal the wavelength of which is the wavelength λk, output from the common optical source 104, and outputs the selected optical signal to the coherent modulator 37. On the basis of the optical signal selected in the 2×1 optical switch 108, the coherent modulator 37 modulates and outputs a client signal to the optical Add/Drop unit 39.

When no failure occurs, the optical source controller 105 controls the 2×1 optical switch 107 so that the 2×1 optical switch 107 selects local oscillator light the wavelength of which is λx, output from the local oscillator light optical source 34.

When receiving error information, the optical source controller 105 controls the 2×1 optical switch 107 so that the 2×1 optical switch 107 selects local oscillator light the wavelength of which is λk, output from the common optical source 104. Accordingly, when the failure occurs, the coherent demodulator 36 can performs demodulation using local oscillator light that has the wavelength λk for the protection channel.

When receiving error information, the optical source controller 105 controls the 2×1 optical switch 108 so that the 2×1 optical switch 108 selects local oscillator light the wavelength of which is λk, output from the common optical source 104 as necessary. Accordingly, when the failure occurs, the coherent modulator 37 can modulate the client signal using the optical signal that has the wavelength λk for the protection channel.

According to the fifth embodiment, when a failure occurs in an optical line or the like, each of the coherent optical transceivers 91-1 on the receiving side and the transmitting side can autonomously change each of the wavelengths of the local oscillator light and the transmission signal to a predetermined channel wavelength for a protection channel. Accordingly, the communication between the transmitting side and the receiving side can be resumed. The client signal can be modulated into an optical signal that has the wavelength for the protection channel and transmitted, as necessary.

In the fifth embodiment, since the coherent optical receiver 102 and the coherent optical transmitter 103 use the common optical source, the circuits thereof can be simplified.

Figure 11:
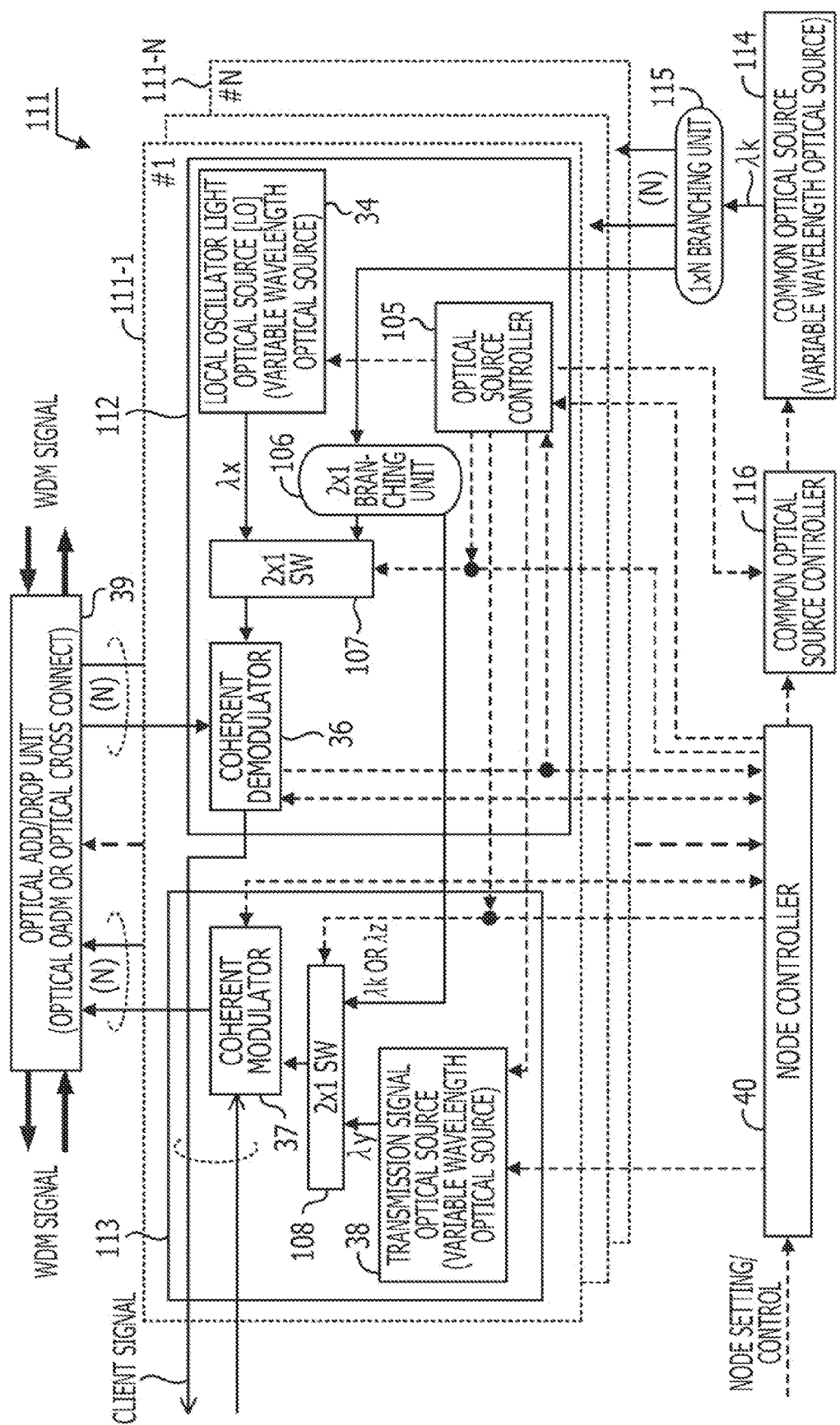
FIG. 11 is a diagram illustrating an example of a coherent optical communication device in a sixth embodiment.

FIG. 11 is a diagram illustrating an example of a coherent optical communication device 111 in a sixth embodiment. In the sixth embodiment, one common optical source 114 is provided for a plurality of coherent optical transceivers 111-1 to 111-N. In the description, hereinafter, the same symbol is assigned to the same block as those in FIGS. 2 and 10, and the description thereof will be omitted.

The coherent optical communication device 111 includes the coherent optical transceivers 111-1 to 111-N for a plurality of channels. The coherent optical transceiver 111-1 includes a coherent optical receiver 112 and a coherent optical transmitter 113. While only the configuration of the coherent optical transceiver 111-1 is illustrated in FIG. 11, other coherent optical transceivers 111-2 to 111-N have substantially the same configurations.

For the plurality of coherent optical transceivers 111-1 to 111-N, one common optical source 114, a 1×N optical splitter 115 that divides the output light of the common optical source 114 into N branches, and a common optical source controller 116 are provided.

On the basis of control information output from an optical source controller 105 in each of the coherent optical communication devices 111-1 to 111-N or the node controller 40, the common optical source controller 116 sets the wavelength of an optical signal generated in the common optical source 114. For example, when an error occurs, the common optical source controller 116 sets the wavelength of output light from the common optical source 114 to the wavelength λk. The optical signal that has the wavelength λk is divided into N branches in the 1×N optical splitter 115, and is output to a 2×1 optical splitter 106 in each of the coherent optical transceivers 111-1 to 111-N.

When receiving error information from the coherent demodulator 36, the optical source controller 105 controls the 2×1 optical switch 107 so that the 2×1 optical switch 107 selects the output of the 2×1 optical splitter 106, namely, the output of the common optical source 114. As a result, an optical signal, which has the wavelength λk and is output light from the common optical source 114, is output from the 2×1 optical switch 107 to the coherent demodulator 36. In addition, in the coherent demodulator 36, a reception signal is demodulated using local oscillator light that has the wavelength λk for the protection channel.

In the coherent optical transmitter 113, in substantially the same way, the client signal can also be modulated using the output light of the common optical source 114. Accordingly, when a failure occurs or the like, the wavelength of a transmission signal can be changed to the wavelength for the protection channel as necessary.

According to the sixth embodiment, when a failure occurs in an optical line or the like, each of the coherent optical transceivers 111-1 to 111-N on the receiving side and the transmitting side can autonomously change each of the wavelengths of the local oscillator light and the transmission signal to a predetermined wavelength for an channel. Accordingly, the communication between the transmitting side and the receiving side can be resumed. Furthermore, the common optical source 114 is used for the plurality of coherent optical transceivers 111-1 to 111-N, and hence the entire circuit of the coherent optical communication device can be simplified.

Figure 12:
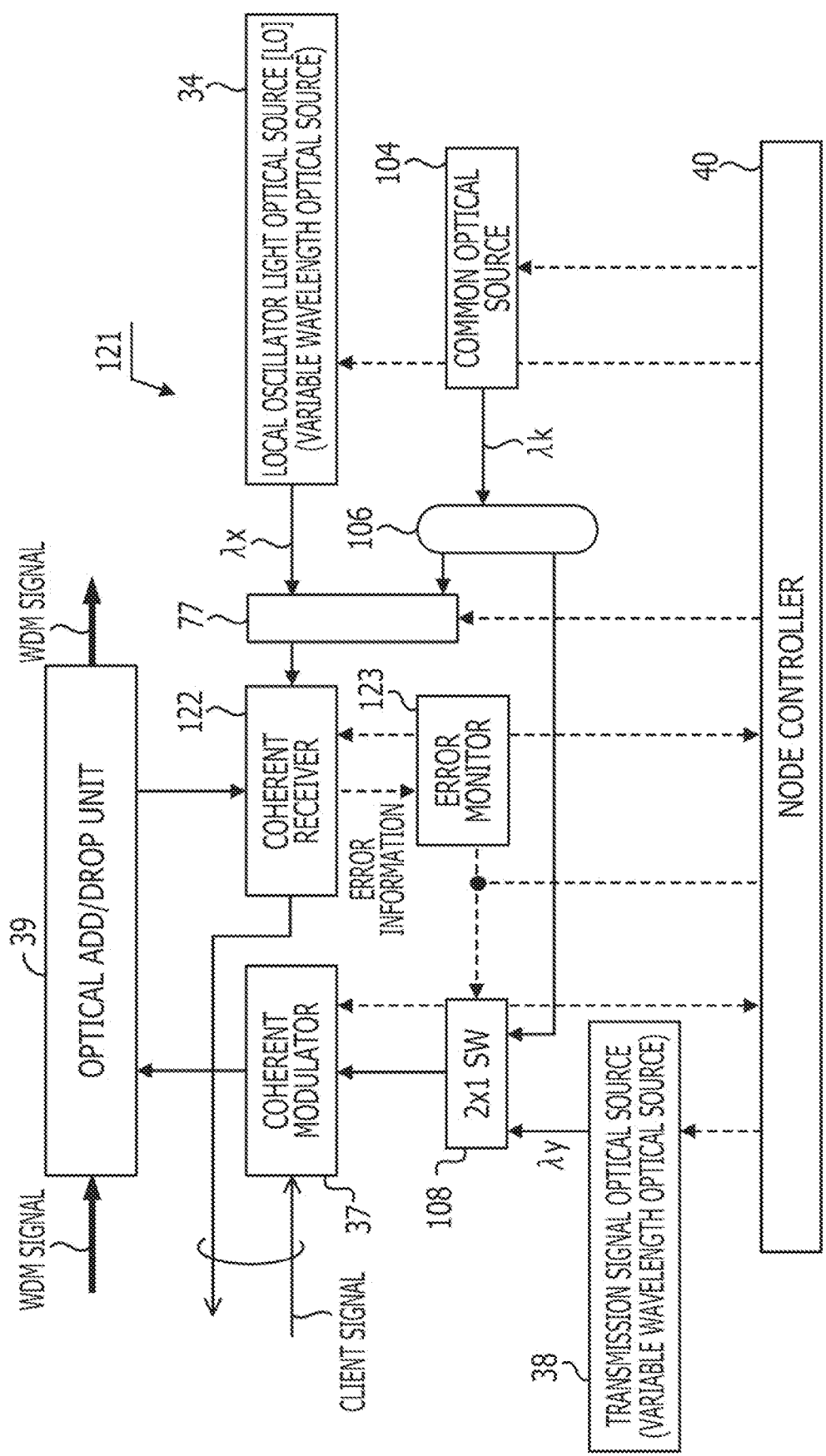
FIG. 12 is a diagram illustrating an example of an optical node in a seventh embodiment.

FIG. 12 is a diagram illustrating an example of an optical node in a seventh embodiment. In the seventh embodiment, optical sources for a coherent receiver 122 and a coherent modulator 37 are integrated into one optical source. Furthermore, the wavelength of the output light of a common optical source 104 is controlled by the node controller 40.

In the description, hereinafter, the same symbol is assigned to the same block as that in FIG. 10, and the description thereof will be omitted. While the optical node includes a plurality of coherent optical transceivers 121, one coherent optical transceiver 121 is illustrated in FIG. 12 for ease of description.

The optical node illustrated in FIG. 12 includes an optical Add/Drop unit 39, a coherent optical transceiver 121, and the node controller 40.

The configuration of the coherent optical transceiver 121 is substantially the same as that of the coherent optical transceiver 101-1 illustrated in FIG. 10. The configuration of the coherent optical transceiver 121 is different from the coherent optical transceiver 101-1 illustrated in FIG. 10 in that a coherent receiver 122 and an error monitor 123 are provided in place of the coherent demodulator 36.

The coherent receiver 122 demodulates, using local oscillator light, a coherent modulated signal received from the optical Add/Drop unit 39, and outputs error information to the error monitor 123. The error monitor 123 monitors information output from the coherent receiver 122. When receiving the error information, the error monitor 123 notifies the node controller 40 of the occurrence of an error.

The node controller 40 includes a function for setting the wavelength of the local oscillator light of the local oscillator light optical source 34, a function for setting the wavelength of the output light of the common optical source 104, and a function for setting the wavelength of the output light of the transmission signal optical source 38. The node controller 40 includes a function for changing over a 2×1 optical switch 77 on the receiver side and a function for changing over a 2×1 optical switch 108 on the transmitter side.

When the error monitor 123 notifies the node controller 40 of an error, the node controller 40 outputs a signal used for setting the wavelength of the common optical source 104 to the wavelength λk for the protection channel. The node controller 40 outputs a signal that instructs the 2×1 optical switches 77 and 108 to select the output light of the common optical source 104.

The 2×1 optical switch 77 selects and outputs the output light of the common optical source 104 to the coherent receiver 122. Accordingly, using the local oscillator light that has the wavelength λk for the protection channel, the coherent receiver 122 can demodulate the coherent modulated signal.

In substantially the same way, the 2×1 optical switch 108 on the transmitter side selects and outputs the output of the 2×1 optical splitter 106 to the coherent modulator 37. Accordingly, the coherent modulator 37 can modulate the client signal using the light that has the wavelength λk for the protection channel.

According to the seventh embodiment, when a failure or the like occurs in an optical line, each of the coherent optical transceivers 121 on the receiving side and the transmitting side can autonomously change each of the wavelengths of the local oscillator light and the transmission signal to a predetermined wavelength for a channel. Accordingly, the communication between the transmitting side and the receiving side can be resumed. Since the coherent optical transmitter and the optical receiver use the common optical source 104, a wavelength can be changed in a short time at the time of a failure occurrence. Since the node controller 40 includes a function for changing over the wavelength of the common optical source 104, it is not necessary for an optical source controller to be provided in the coherent optical transceiver 121, and hence the circuit of the coherent optical transceiver 121 can be simplified.

Figure 13:
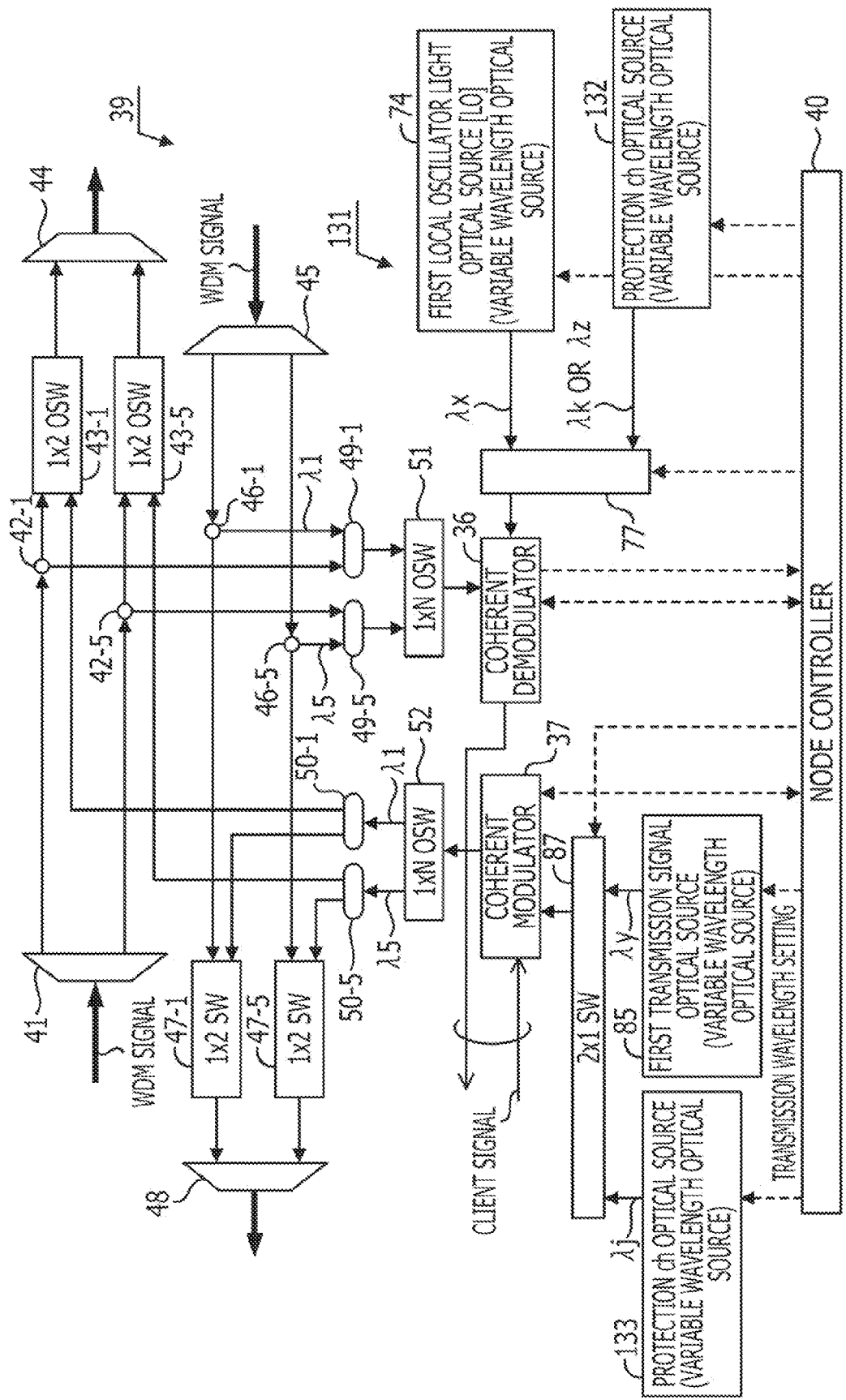
FIG. 13 is a diagram illustrating an example of an optical node in an eighth embodiment.

FIG. 13 is a diagram illustrating an example of an optical node in an eighth embodiment. In the eighth embodiment, each of an optical receiver and an optical transmitter includes a protection channel optical source, and the node controller 40 sets the wavelength of the protection channel optical source.

In the description, hereinafter, the same symbol is assigned to the same block as that in FIG. 8 (the fourth embodiment), and the description thereof will be omitted. In addition, while the optical node includes a plurality of coherent optical transceivers 131, only one coherent optical transceiver 131 is illustrated in FIG. 13.

The optical node illustrated in FIG. 13 includes an optical Add/Drop unit 39, the coherent optical transceiver 131, and a node controller 40. The optical Add/Drop unit 39 is substantially the same as the optical Add/Drop unit 39 illustrated in FIG. 8.

A protection channel optical source 132 on the receiver side is a variable wavelength optical source generating local oscillator light that has the wavelength of a changeover destination channel, and corresponds to the second local oscillator light optical source 75 in FIG. 8. A protection channel optical source 133 on the transmitter side is a variable wavelength optical source generating the optical signal of a changeover destination channel, used when a transmission signal is modulated, and corresponds to the second transmission signal optical source 86 in FIG. 8.

A coherent demodulator 36 demodulates, using local oscillator light, a coherent modulated signal received from the optical Add/Drop unit 39, and determines whether or not there is an error in a reception signal. When detecting an error, the coherent demodulator 36 outputs error information to the node controller 40.

The node controller 40 includes a function for setting the wavelength of the output light of each of the first local oscillator light optical source 34 and the protection channel optical source 132 and a function for setting the wavelength of the output light of each of the first transmission signal optical source 85 and the protection channel optical source 133. The node controller 40 includes a function for changing over local oscillator light selected by the 2×1 optical switch 77 on the receiver side and an optical signal that is used for a transmission signal and selected by the 2×1 optical switch 87 on the transmitter side.

The node controller 40 outputs a signal used for setting the wavelength of local oscillator light for a currently used channel to the first local oscillator light optical source 74, and outputs a signal used for setting the wavelength of local oscillator light for the protection channel to the protection channel optical source 132. The node controller 40 outputs a signal used for setting the wavelength for the currently used channel to the first transmission signal optical source 85, and outputs a signal used for setting the wavelength for the protection channel to the protection channel optical source 133.

The node controller 40 includes a storage unit such as a memory or the like. Information used for setting the wavelength of the output light of each of the first local oscillator light optical source 74, the protection channel optical source 132, the first transmission signal optical source 85, and the protection channel optical source 133 and the power level thereof are preliminarily stored in the storage unit. For example, the wavelength of local oscillator light, which is set to the wavelength of the first local oscillator light optical source 74, is λx, and a wavelength that is set to the wavelength of the protection channel optical source 132 is λk. A wavelength that is set to the wavelength of the first transmission signal optical source 85 is λy, and a wavelength that is set to the wavelength of the protection channel optical source 133 is λj.

When receiving error information from the coherent demodulator 36, the node controller 40 controls the 2×1 optical switch 77 on the receiver side so that the 2×1 optical switch 77 selects the output light of the protection channel optical source 132. Substantially simultaneous, the node controller 40 controls the 2×1 optical switch 87 on the transmitter side so that the 2×1 optical switch 87 selects the output light of the protection channel optical source 133.

The node controller 40 changes over the 2×1 optical switches 77 and 87 as described above, and thereby the coherent demodulator 36 can demodulate the coherent modulated signal, using the local oscillator light that has the wavelength λk for the protection channel. The coherent modulator 37 can modulate the client signal, using the optical signal that has the wavelength λj for the protection channel.

According to the eighth embodiment, when a failure or the like occurs in an optical line, each of the coherent optical transceivers 61-1 on the receiving side and the transmitting side can autonomously change each of the wavelengths of the local oscillator light and the transmission signal to a predetermined wavelength for a changeover destination channel. Accordingly, the communication between the transmitting side and the receiving side can be resumed. Furthermore, since the protection channel optical sources 132 and 133 are provided, a wavelength can be changed in a short time at the time of a failure occurrence. Since the node controller 40 includes a function for changing over the wavelengths of the local oscillator light and the transmission signal, it is not necessary for an optical source controller to be provided in the coherent optical transceiver 131, and hence the circuit of the coherent optical transceiver 131 can be simplified.

Figure 14:
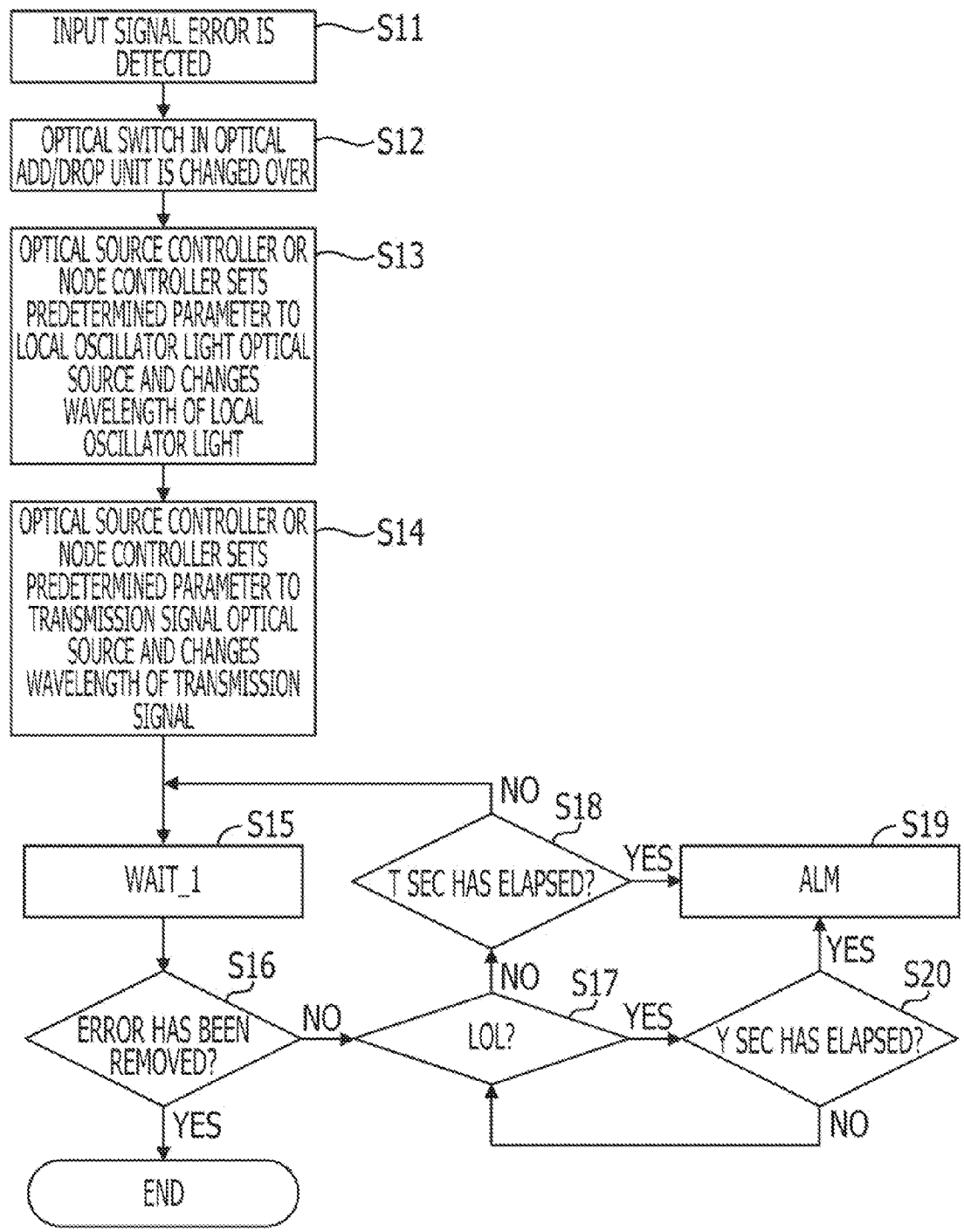
FIG. 14 is an example of a wavelength change processing operation performed when one local oscillator light optical source and one transmission signal optical source are included.

Next, FIG. 14 is an example of a wavelength change processing operation performed in a coherent optical transceiver that includes one local oscillator light optical source and one transmission signal optical source. For example, a processing operation described hereinafter is executed by a CPU in the coherent optical transceiver, or is realized with hardware.

When an error in an input signal is detected (S11), a controller (CPU) in the optical Add/Drop unit 39 changes over an optical switch to a protection channel side (S12), for example. In Operation S11, for example, the coherent demodulator 36 in FIG. 2 determines whether or not there is an error in the reception signal, and notifies the optical Add/Drop unit 39, the optical source controller 35, and the node controller 40 of the error detection result. When being notified that the error has been detected, the optical Add/Drop unit 39 changes over the optical switch to the protection channel side, and outputs the optical signal of the protection channel to the coherent optical transceiver 31-1.

When being notified of the error of the reception signal, the optical source controller 35 in the coherent optical transceiver or the node controller 40 sets a parameter, used for specifying the predetermined wavelength for the protection channel and the power level thereof, to the local oscillator light optical source 34, and changes the wavelength of local oscillator light (S13). For example, the parameter used for setting the predetermined wavelength for the protection channel and the power level thereof to the local oscillator light optical source 34 is preliminarily stored in a storage unit such as a memory or the like in the optical source controller 35 or the node controller 40.

Next, the optical source controller 35 or the node controller 40 sets a parameter, used for specifying the predetermined wavelength for the protection channel and the power level thereof, to the transmission signal optical source 38, and changes the wavelength of an optical signal used for a transmission signal (S14). For example, the parameter used for setting the predetermined wavelength for the protection channel and the power level thereof to the transmission signal optical source 38 is preliminarily stored in a storage unit such as a memory or the like in the optical source controller 35 or the node controller 40.

Next, a processing operation "Wait_1" is executed to wait for a constant time (S15), and it is determined whether or not the error has been removed (S16). When the error has not been removed yet (S16, NO), a processing operation proceeds to Operation S17, and it is determined whether or not an optical signal is in a discontinuation state (Loss of light: LOL).

When the optical signal is not in the discontinuation state (S17, NO), namely, an optical signal is received from another communication device, the processing operation proceeds to Operation S18, and it is determined whether or not a predetermined period of time T sec has elapsed.

When T sec has not elapsed (S18, NO), processing operations subsequent to Operation S15 are repeated. On the other hand, when T sec has elapsed (S18, YES), the processing operation proceeds to Operation S19, and alarm is set.

When, in Operation S17, it is determined that the optical signal is in the discontinuation state (S17, YES), the processing operation proceeds to Operation S20, and it is determined whether or not a predetermined period of time Y sec has elapsed. When the optical signal is in the discontinuation state and Y sec has elapsed (S20, YES), the processing operation proceeds to Operation S19, and alarm is set.

According to the processing operation described above, when an error in the reception signal is detected, each of the coherent optical transceivers on the receiving side and the transmitting side can autonomously change each of the wavelengths of the local oscillator light and the transmission signal to a predetermined wavelength for a protection channel. Accordingly, even if a failure occurs in a communication line or the like, the communication between the transmitting side and the receiving side can be resumed in a short time.

FIGS. 15A and 15B are diagrams illustrating examples of parameter data of an optical source controller. FIG. 15A illustrates, as parameter data, temperatures and current values in a case in which the wavelength of a variable wavelength optical source is controlled on the basis of the temperature and the current value. FIG. 15B illustrates, as parameter data, current values in a case in which the wavelength is controlled by controlling the current value supplied to the variable wavelength optical source.

For example, parameter data illustrated in FIGS. 15A and 15B, namely, the wavelength and current value (or, a temperature and a current value) of each of all channels (a protection channel is included) are stored, with being associated with one another, in the storage unit in the optical source controller 35.

When it is intended to generate local oscillator light that has the wavelength for a channel ch1, the optical source controller 35 acquires a current value that is stored in the storage unit and corresponds to the channel ch1. In addition, an electric current of the acquired current value is supplied to the local oscillator light optical source 34. Accordingly, local oscillator light that has the wavelength for the channel ch1 is output from the local oscillator light optical source 34.

When receiving error information, the optical source controller 35 acquires a current value for the protection channel, stored in the storage unit, and supplies the acquired current to the local oscillator light optical source 34. Accordingly, local oscillator light that has the wavelength for the protection channel is output from the local oscillator light optical source 34.

While, in the example described above, the wavelengths and current values (or, temperatures and current values) of all channels are stored in the storage unit in the optical source controller 35, it is not always necessary to store wavelength information (information for setting wavelengths) of all channels. Wavelength information of some channels that includes a changeover destination channel may be stored in the storage unit.

Figure 16:
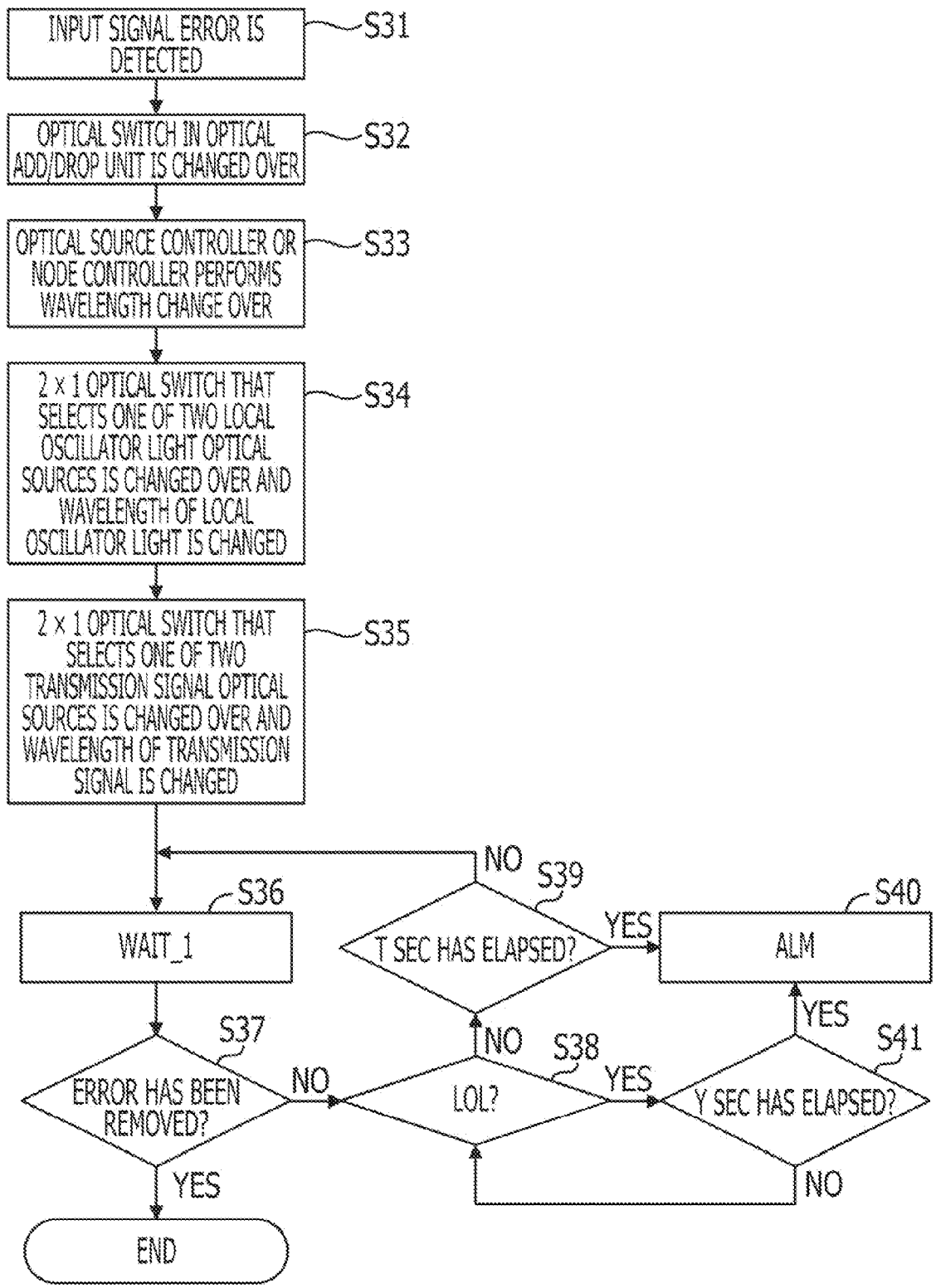
FIG. 16 is an example of a wavelength change processing operation performed when two local oscillator light optical sources and two transmission signal optical sources are included.

FIG. 16 is an example of a wavelength change processing method performed in a coherent optical transceiver that includes two local oscillator light optical sources and two transmission signal optical sources. A processing operation described hereinafter is executed by a CPU in the coherent optical transceiver, or is realized with hardware.

When an error in an input signal is detected (S31), a controller (CPU) in the optical Add/Drop unit 39 changes over an optical switch to a protection channel side (S32), for example. In Operation S32, for example, the coherent demodulator 36 in FIG. 7 determines whether or not there is an error in the reception signal, and notifies the optical Add/Drop unit 39 and the optical source controller 35 of the error detection result. When being notified that the error has been detected, the optical Add/Drop unit 39 changes over an optical switch to the protection channel side, and outputs the optical signal for the protection channel to the coherent optical transceiver 31-1.

An optical source controller in the coherent optical transceiver (for example, the optical source controller 84 in FIG. 7)

or a node controller (for example, the node controller 40 in FIG. 7) sets the wavelength of the output light of each of two local oscillator light optical sources and two transmission signal optical sources (S33).

When an error is detected, the optical source controller or the node controller changes over a 2×1 optical switch so that the 2×1 optical switch selects a local oscillator light optical source that generates local oscillator light for the protection channel from among two local oscillator light optical sources, and hence changes the wavelength of local oscillator light (S34). In the processing operation performed in Operation S34, for example, the optical source controller 84 or the node controller 40 in FIG. 7 changes over the 2×1 optical switch 77 so that the 2×1 optical switch 77 selects the second local oscillator light optical source 75 generating the local oscillator light that has the wavelength λk for the protection channel.

When an error is detected, the optical source controller or the node controller changes over a 2×1 optical switch so that the 2×1 optical switch selects a transmission signal optical source that generates an optical signal used for a transmission signal of the protection channel from among two transmission signal optical sources, and hence changes the wavelength of a transmission signal (S35). In the processing operation performed in Operation S35, for example, the optical source controller 84 or the node controller 40 in FIG. 7 changes over the 2×1 optical switch 87 so that the 2×1 optical switch 87 selects the second transmission signal optical source 86 generating the optical signal that has the wavelength λj for the protection channel.

Next, a processing operation "Wait_1" is executed to wait for a constant time (S36). After that, it is determined whether or not the error has been removed (S37). When the error has not been removed yet (S37, NO), a processing operation proceeds to Operation S38, and it is determined whether or not an optical signal is in a discontinuation state.

When the optical signal is not in the discontinuation state (S38, NO), the processing operation proceeds to Operation S39, and it is determined whether or not T sec (a predetermined period of time) has elapsed. When T sec has not elapsed (S39, NO), processing operations subsequent to Operation S36 are repeated. On the other hand, when a period of time more than or equal to T sec has elapsed, the processing operation proceeds to Operation S40, and alarm is set in order to give notice of a failure occurrence.

When, in Operation S38, it is determined that the optical signal is in the discontinuation state (S38, YES), the processing operation proceeds to Operation 541, and it is determined whether or not Y sec (a predetermined period of time) has elapsed. When Y sec has not elapsed (S41, NO), processing operations subsequent to Operation S38 are repeated. On the other hand, when Y sec has elapsed (S41, YES), the processing operation proceeds to Operation S40, and alarm is set in order to give notice of a failure occurrence.

On the basis of the processing operation described above, when an error in the reception signal is detected, each of the coherent optical transceivers on the receiving side and the transmitting side can autonomously change the wavelength of the local oscillator light to a predetermined wavelength for a protection channel. Even if a failure occurs in a communication line, the communication between the transmitting side and the receiving side can be resumed in a short time.

FIGS. 17A and 17B are diagrams illustrating other examples of parameter data stored in an optical source controller. FIG. 17A illustrates parameter data used for controlling the wavelength of the first local oscillator light optical source 74. FIG. 17B illustrates parameter data used for controlling the wavelength of the second local oscillator light optical source 75.

The parameter data illustrated in FIGS. 17A and 17B is data in which the wavelength, the temperature, the current value, and the output value of each of channels (a protection channel is included) are associated with one another. Parameter data for 56 channels is illustrated in FIGS. 17A and 17B. These pieces of parameter data are stored in a storage unit such as a memory or the like in the optical source controller 76 (or, the node controller 40).

In addition, while the same wavelength has different temperatures, current values, and output values in FIGS. 17A and 17B, this indicates that the two local oscillator light optical sources have characteristics different from each other.

When receiving error information, the optical source controller 76 acquires a predetermined current value (or, a temperature, a current value, and an output value), which corresponds to the protection channel and is stored in the storage unit, and supplies the acquired current to the first local oscillator light optical source 34. Accordingly, local oscillator light that has the wavelength for the protection channel is output from the local oscillator light optical source 34.

It is not always necessary to store parameter data of all channels in the storage unit in the optical source controller 76. For example, when the control object channel of the optical source controller 76 is limited, parameter data for necessary channels may be stored. It is not necessary to store total parameter data that includes wavelengths, temperatures, current values, and output values in the storage unit but necessary data included in the total parameter data may be stored.

Figure 18:
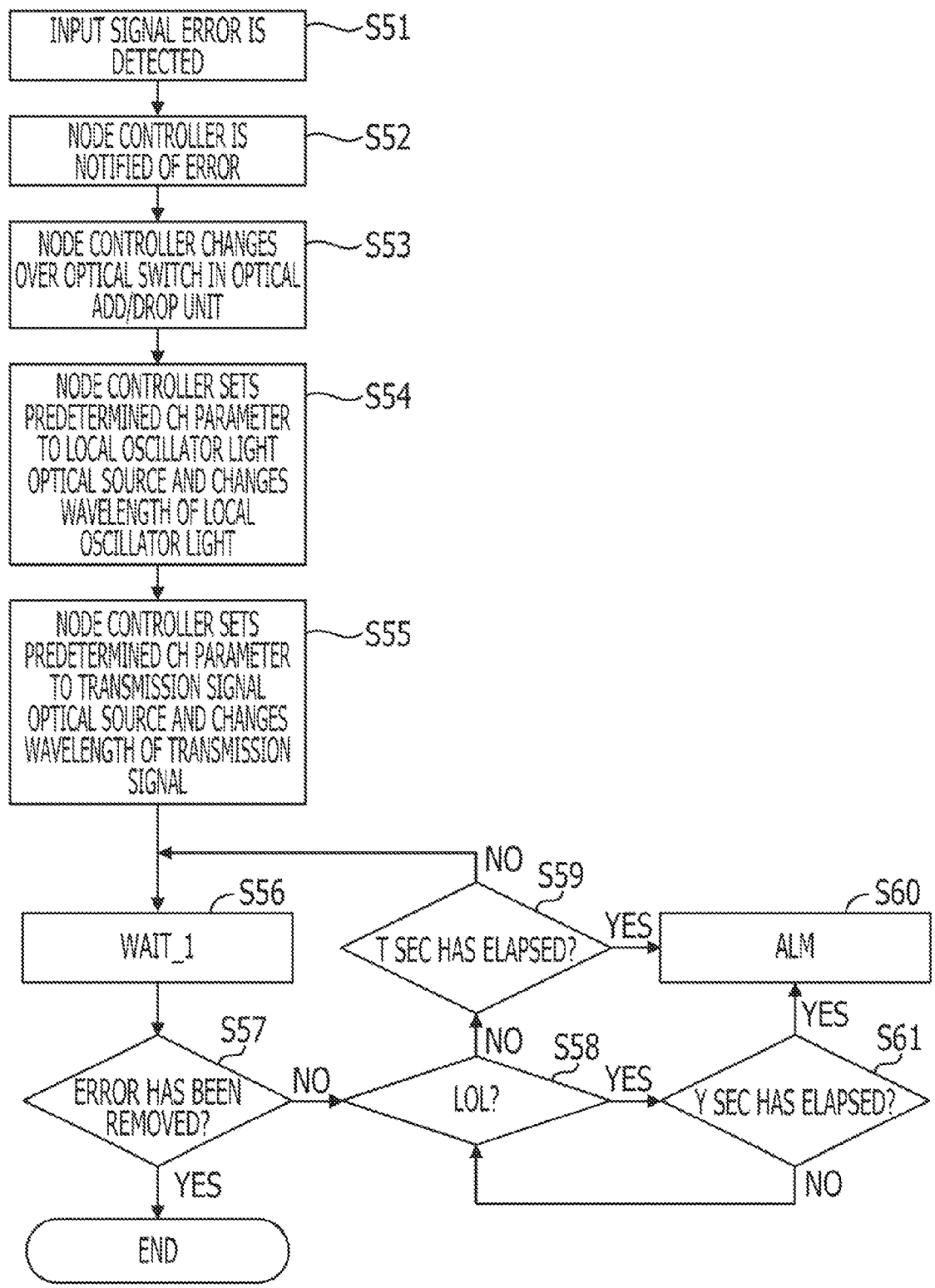
FIG. 18 is an example of a wavelength change processing operation performed in a node controller.

Next, FIG. 18 is an example of a method in which a coherent optical transceiver includes one local oscillator light optical source and one transmission signal optical source and a node controller changes the wavelengths of the local oscillator light optical source and the transmission signal optical source. A processing operation described hereinafter is executed by a CPU in the coherent optical transceiver, or is realized with hardware. The processing operation will be described hereinafter, taking the coherent optical transceiver 31-1 and the node controller 40 illustrated in FIG. 2 for example.

The coherent demodulator 36 detects an error in an input signal (S51). When an error is detected, the coherent demodulator 36 notifies the node controller 40 of the error (S52).

When an error in the reception signal is detected, the node controller 40 changes over an optical switch in the optical Add/Drop unit 39 to a protection channel side (S53).

When an error in the reception signal is detected, the node controller 40 sets a setting parameter, used for specifying a predetermined wavelength or the like for the protection channel, to the local oscillator light optical source 34, and changes the wavelength of local oscillator light (S54).

When an error in the reception signal is detected, the node controller 40 sets a parameter, used for specifying a predetermined wavelength or the like for the protection channel, to the transmission signal optical source, and changes the wavelength of a transmission signal (S55).

Next, a processing operation "Wait_1" is executed to wait for a constant time (S56). After that, it is determined whether or not the error has been removed (S57). When the error has been removed (S57, YES), namely, communication has been available as a result of the changeover to the wavelength for the protection channel, the processing operation is terminated.

When the error has not been removed yet (S57, NO), the processing operation proceeds to Operation S58, and it is determined whether or not an optical signal is in a discontinuation state. When, in Operation S58, it is determined that the optical signal is not in the discontinuation state (S58, NO), the processing operation proceeds to Operation S59, and it is determined whether or not a predetermined period of time T sec has elapsed. When T sec has elapsed (S59, YES), the processing operation proceeds to Operation S60, and alarm is set in order to give notice of a failure occurrence.

When, in Operation S58, it is determined that the optical signal is in the discontinuation state (S58, YES), the processing operation proceeds to Operation S61, and it is determined whether or not a predetermined period of time Y sec has elapsed. When Y sec has not elapsed (S61, NO), the processing operation returns to Operation S58, and it is determined whether or not the optical signal is in a discontinuation state. When a period of time more than or equal to Y sec has elapsed (S61, YES), the processing operation proceeds to Operation S60, and alarm is set.

On the basis of the processing operation described above, when an error in the reception signal is detected, each of the coherent optical transceivers on the receiving side and the transmitting side can autonomously change the wavelength of the local oscillator light to a predetermined wavelength for a protection channel. Accordingly, even if a failure occurs in a communication line, the communication between the transmitting side and the receiving side can be resumed in a short time. In this case, since one local oscillator light optical source and one transmission signal optical source are provided in the coherent optical transceiver, the configuration of the circuit of the coherent optical transceiver is simplified.

Figure 19:
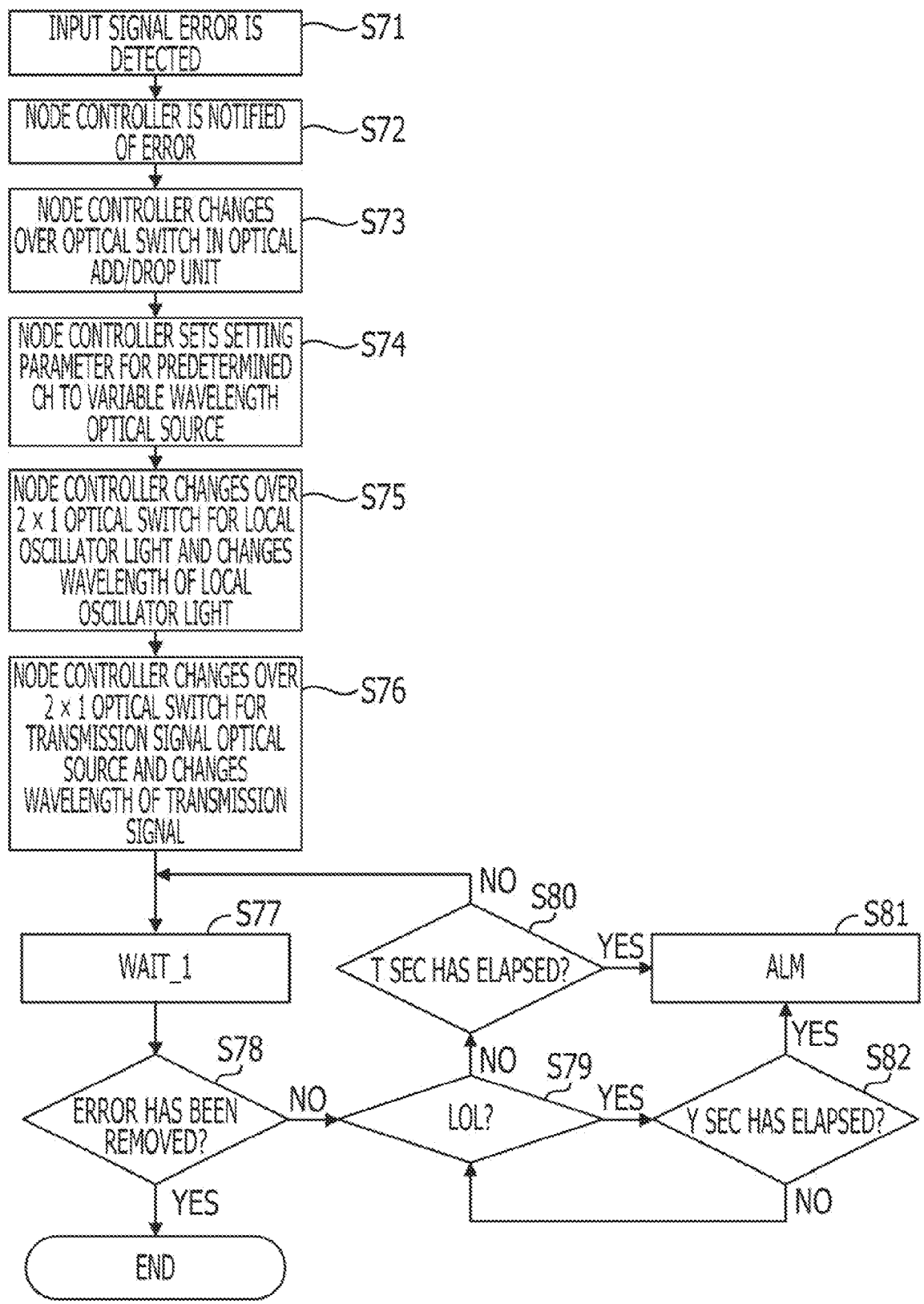
FIG. 19 is another example of a wavelength change processing operation performed in the node controller.

Next, FIG. 19 is a method in which a coherent optical transceiver includes two local oscillator light optical sources and two transmission signal optical sources and a node controller changes the wavelengths of local oscillator light and a transmission signal by changing over optical switches in the coherent optical transceiver. A processing operation described hereinafter is executed by a CPU in the coherent optical transceiver, or is realized with hardware. The processing operation will be described hereinafter, taking the coherent optical transceiver 81-1 and the node controller 40 illustrated in FIG. 7 for example.

The coherent demodulator 36 detects an error in an input signal (S71). When an error is detected, the coherent demodulator 36 notifies the node controller 40 of the error (S72).

When being notified of the error, the node controller 40 changes over an optical switch in the optical Add/Drop unit 39 to a protection channel side (S73).

The node controller 40 sets parameter data, used for a protection channel, to the second local oscillator light optical source 75 and the second transmission signal optical source 86 (or, parameter data used for the protection channel is preliminarily set).

When being notified of the error occurring in the reception signal, the node controller 40 changes over the 2×1 optical switch 77 in the coherent optical receiver 82 to the protection channel side, and changes the wavelength of local oscillator light to the wavelength for the protection channel (S75).

When being notified of the error occurring in the reception signal, the node controller 40 changes over the 2×1 optical switch 87 in the coherent optical transmitter 83 to the protection channel side, and changes the wavelength of an optical signal used for modulating a transmission signal to the wavelength for the protection channel (S76).

Next, a processing operation "Wait_1" is executed to wait for a constant time (S77). After that, it is determined whether or not the error has been removed (S78).

When the error has been removed, the processing operation is terminated. On the other hand, when the error has not been removed yet (S78, NO), the processing operation proceeds to Operation S79, and it is determined whether or not an optical signal is in a discontinuation state.

When the optical signal is not in the discontinuation state, the processing operation proceeds to Operation S80, and it is determined whether or not a predetermined period of time T sec has elapsed. When T sec has not elapsed (S80, NO), processing operations subsequent to Operation S77 are repeated. On the other hand, when a period of time more than or equal to T sec has elapsed (S80, YES), the processing operation proceeds to Operation S81, and alarm is set in order to give notice of a failure occurrence.

When, in Operation S79, it is determined that the optical signal is in the discontinuation state (S79, YES), the processing operation proceeds to Operation S82, and it is determined whether or not a period of time more than or equal to a predetermined period of time Y sec has elapsed. When an elapsed period of time is less than Y sec (S82, NO), the processing operation returns to Operation S79, and it is determined again whether or not the optical signal is in a discontinuation state. On the other hand, when the optical signal is in a discontinuation state and a period of time more than or equal to Y sec has elapsed, the processing operation proceeds to Operation S81, and alarm is set in order to give notice of a failure occurrence.

According to the processing operation described above, when an error in the reception signal is detected, each of the coherent optical transceivers on the receiving side and the transmitting side can autonomously change each of the wavelengths of the local oscillator light and the transmission signal to a predetermined wavelength for a protection channel. Accordingly, even if a failure occurs in a communication line, the communication between the transmitting side and the receiving side can be resumed in a short time. In this case, since two local oscillator light optical sources are used and the outputs thereof are changed over by optical switches, a wavelength can be changed to a wavelength for the protection channel in a short time if a failure occurs.

The power attenuation of an optical signal in a case in which the output light of each of the local oscillator light optical source and the common optical source is changed by an optical switch will be described with reference to FIGS. 20 and 21.

Figure 20:
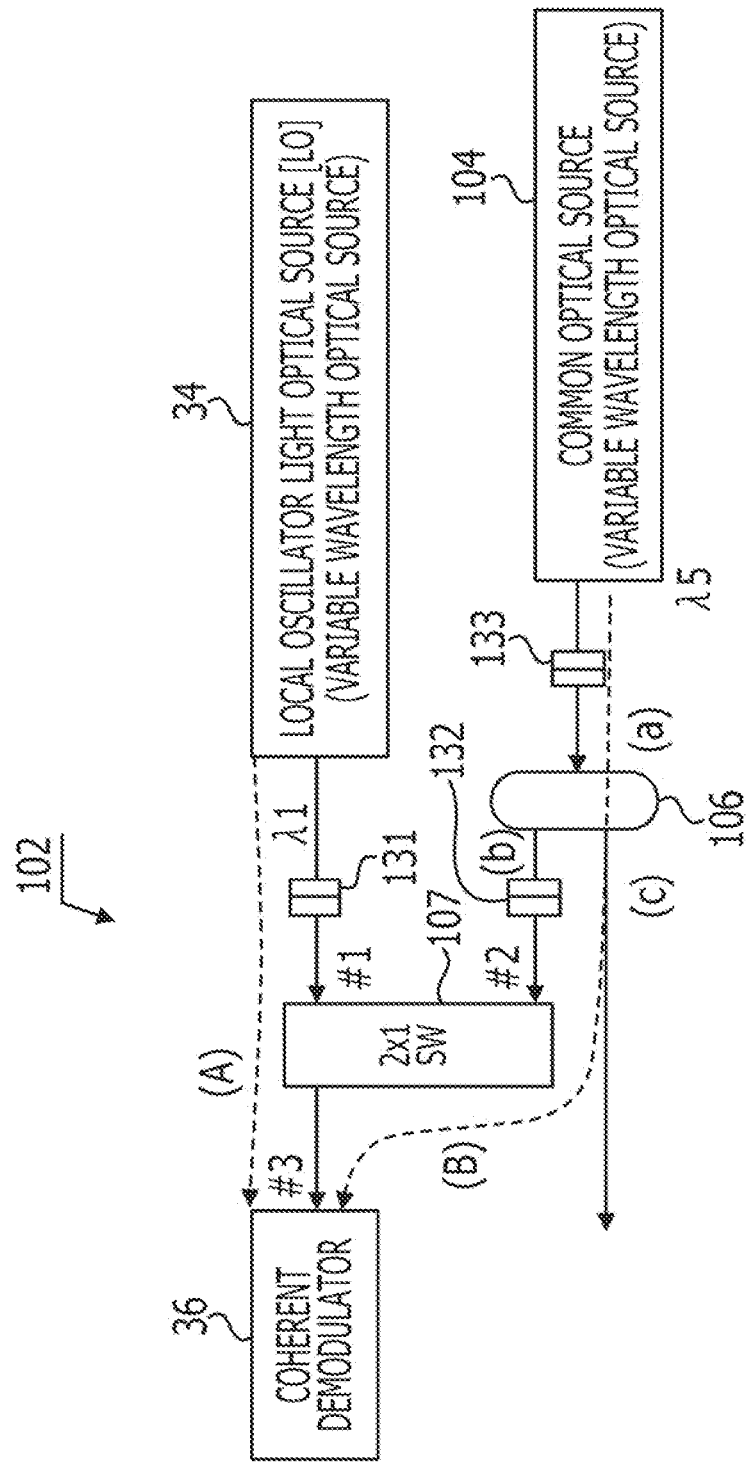
FIG. 20 is a diagram illustrating an example of a propagation route of local oscillator light.

FIG. 20 is a diagram illustrating an example of a propagation route of a local oscillator light. FIG. 21 is a diagram illustrating total losses that includes the losses of optical elements and a route that are illustrated in FIG. 20.

As illustrated in FIG. 20, a coherent optical receiver 102 includes a local oscillator optical source 34, a common optical source 104 used as an optical source for a local oscillator light and a transmission signal, a coherent demodulator 36, a 2×1 optical switch 107, and a 2×1 optical splitter 106.

The output light of the local oscillator light optical source 34 passes through a connector 131 and is input to one input #1 of the 2×1 optical switch 107. The output light of the common optical source 104 passes through a connector 133 and is divided into two branches in the 2×1 optical splitter 106. One branch of the divided output light passes through a connector 132 and is input to the other input #2 of the 2×1 optical switch 107. The output light of the 2×1 optical switch 107 is input to the input #3 of the coherent demodulator 36. The light divided in the 2×1 optical splitter 106 is output to a 2×1 optical switch not illustrated in FIG. 20.

The following factors may be thought as the loss of an optical signal in a route through which a local oscillator light is propagated. The factors may be the difference between losses due to the difference between the number of components on routes, the variations of the characteristics of individual optical elements, and the like. For example, as the variations of the characteristics of individual optical elements, there are variations due to the individual variability of the individual optical elements, the variations of the wavelength-dependent losses of optical elements, the variation of the port loss of an optical switch, and the like.

When the losses and the wavelength-dependent losses of the individual optical elements have values illustrated in FIG. 21, the loss of a route (called route A) that leads from the local oscillator light optical source 34 to the input #3 of the coherent demodulator 36 is expressed as follows.

There are the connector 131 and the 2×1 optical switch 107 on the route A. Referring to FIG. 21, the loss of the connector 131 is "0.4 dB", the loss of the 2×1 optical switch 107 is "2.8 dB", and the wavelength-dependent loss of a component that has a wavelength $\lambda 1$ is "0.4 dB". Consequently, the total losses of the route A are "3.6 dB". Accordingly, in order to reduce the loss of the input side of the coherent demodulator 36 to 0 dB, it is desirable to set the output of the local oscillator light optical source 34 to "+3.6 dB".

The loss of a route (called route B) that leads from the common optical source 104 to the input #3 of the coherent demodulator 36 is expressed as follows.

There are the connector 133, the 2×1 optical splitter 106, the connector 132, and the 2×1 optical switch 107 on the route B. Referring to FIG. 21, the loss of the connector 133 is "0.5 dB", the loss of the 2×1 optical splitter 106 is "4.3 dB", and the loss of the connector 132 is "0.3 dB". In addition, a loss between the input #2 of the 2×1 optical switch 107 and the input #3 of the coherent demodulator 36 is "3.6 dB", and the wavelength-dependent loss of a component at a wavelength $\lambda 5$ is "0.2 dB". Consequently, the total losses of the route A are "8.9 dB". Accordingly, in order to reduce the loss of the input side of the coherent demodulator 36 to 0 dB, it is desirable to set the output of the common optical source 104 to "+8.9 dB".

Taking a WDM network illustrated in FIG. 22 for example, a wavelength change method performed at the time of a failure occurrence will be described. As illustrated in FIG. 22, 5 optical nodes N1 to N5 are connected in a ring shape using a WDM line. Wavelengths $\lambda 1$ to $\lambda 4$ from among a plurality of channels through which a WDM signal is transmitted are actually used channels, and a wavelength $\lambda 5$ is a protection channel. In a currently used channel between the node N1 and the node N4, a path is set from the node N1 as a basing point in a counterclockwise direction (a route illustrated with a solid line in FIG. 22). A path (protection path) used at the time of a failure occurrence is set from the node N1 as a basing point in a clockwise direction (a route illustrated with a bold dotted line in FIG. 22). While FIG. 22 illustrates a case in which one protection path is set for operation channels the number of which is N, a protection method is not limited to the case. For example, m protection routes may be provided for the operation channels the number of which is N. One protection route may be provided for one operation channel. The network is not limited to the ring network but the wavelength change method can be applied to a network that has another shape such as a mesh type or the like.

FIG. 23A illustrates a state in which a failure occurs in an optical fiber between the optical nodes N1 and N2. When a failure occurs in the optical fiber that connects the optical nodes N1 and N2, an optical signal that has the wavelength $\lambda 1$ for the currently used channel is put in a discontinuation state, and an error is detected in a coherent optical transceiver in the optical node N4.

Figure 23B:
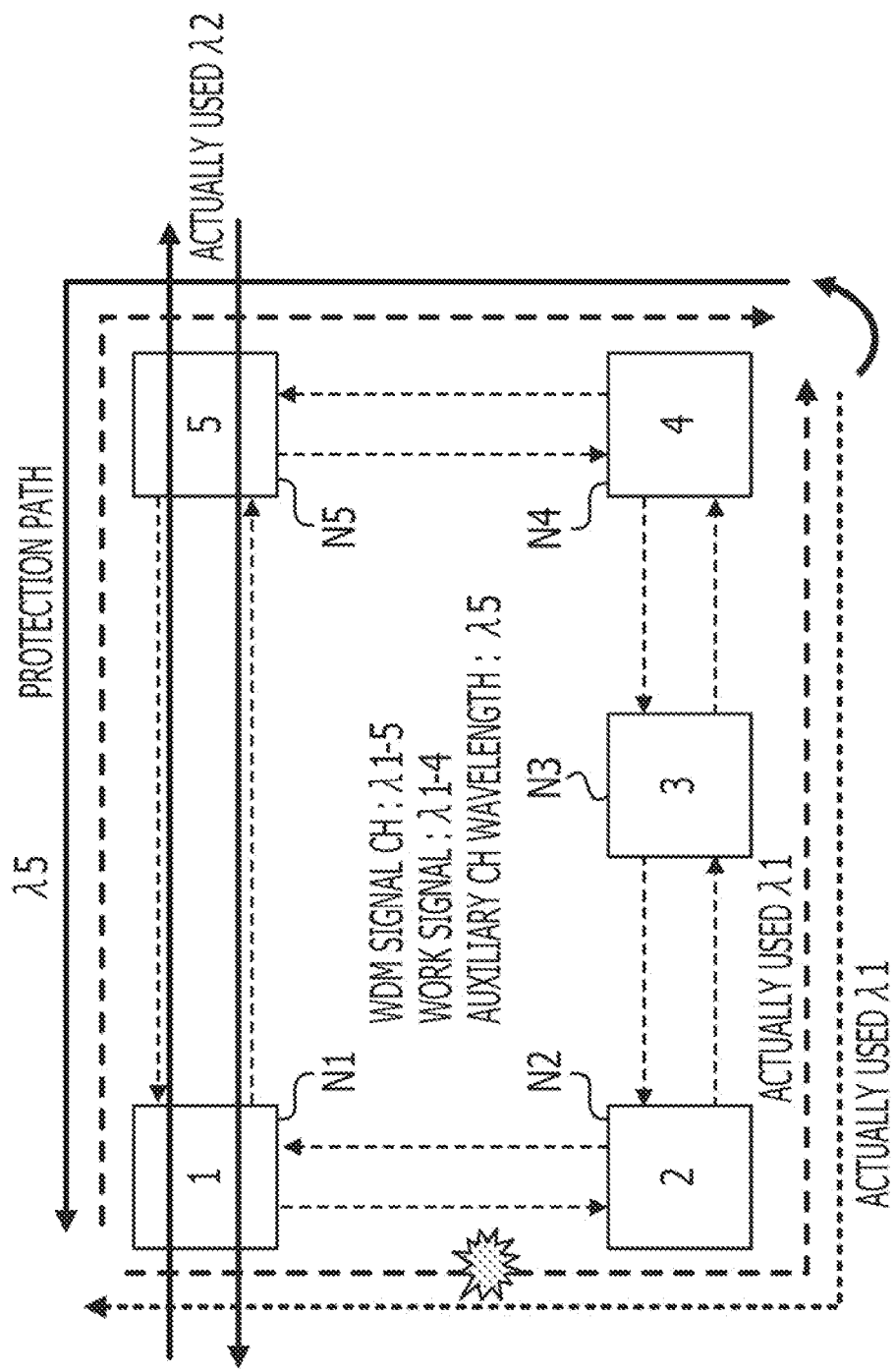

FIG. 23B illustrates a state in which the optical node N4 that has detected an error changes the wavelengths of the local oscillator light and the transmission signal to the wavelength $\lambda 5$ for the protection channel.

When detecting an error, the coherent optical transceiver in the optical node N4 autonomously changes the wavelength of local oscillator light to the predetermined wavelength $\lambda 5$ for the protection channel. Substantially simultaneous, the coherent optical transceiver in an optical node N4 changes the wavelength of a transmission signal to the wavelength $\lambda 5$ for the protection channel. At this time, the optical Add/Drop unit 39 also changes over an optical switch so that the optical switch selects the wavelength $\lambda 5$ for the protection channel.

FIG. 23C illustrates a state in which, after the optical node N4 has changed over to the wavelength for the protection channel, the optical node N1 changes over to the wavelength for the protection channel.

Since the optical node N4 has changed the wavelength of the transmission signal to $\lambda 5$, it is impossible for the optical node N1 to demodulate a coherent modulated signal from the optical node N4, and hence a coherent optical transceiver in the optical node N1 detects an error in a reception signal. When detecting the error, the coherent optical transceiver in the optical node N1 autonomously changes the wavelength of a local oscillator light to the wavelength $\lambda 5$ for the protection channel. Substantially simultaneous, the coherent optical transceiver in the optical node N1 changes the wavelength of a transmission signal to the wavelength $\lambda 5$ for the protection channel.

As described above, when an error in the reception signal is detected, each of the optical nodes on the transmitting side and the receiving side can autonomously change each of the wavelengths of the local oscillator light and the transmission signal to a predetermined wavelength without receiving wavelength information of a changeover destination from another communication device. Accordingly, even if a line failure or the like occurs, the communication between the transmitting side and the receiving side can be resumed in a short time.

Although, in the embodiments, the phase modulation such as QPSK or PSK is described as a modulation method for the coherent optical transceiver, the modulation method is not limited to the phase modulation. For example, amplitude modulation such as ASK (amplitude shift keying) or frequency modulation such as FSK (frequency shift keying) may be used as a modulation method for the coherent optical transceiver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although exemplary implementations of the present inventions have been described in detail, it should be understood that the various changes, substitutions, and alterations could be made hereto without departing from the spirit and scope of the invention.

What is claimed is:

1. A coherent optical communication device comprising:
a plurality of demodulators, each of the plurality of demodulators being configured to demodulate a reception signal having a reception wavelength, detect a failure, and output error information associated with the failure;

a plurality of local oscillator light optical sources, each of the plurality of local oscillator light optical sources configured to generate local oscillator light used for demodulating the reception signal;

a memory configured to store wavelength information; and a node controller configured to communicate with the plurality of the local oscillator light optical sources and the plurality of demodulators with control information, wherein when one of the plurality of demodulators detects the failure of the reception signal, a wavelength of the local oscillator light generated in a local oscillator light optical source, which corresponds to the one of the plurality of demodulators, is changed to a wavelength of a protection channel specified in the wavelength information stored in the memory.

2. The coherent optical communication device according to claim 1, further comprising:

a modulator configured to modulate a transmission signal; and a transmission signal optical source configured to generate an optical signal used for modulating the transmission signal, wherein when the error information that is caused by a failure of the reception signal is received, the node controller changes the wavelength of local oscillator light generated in the local oscillator light optical source and a wavelength of the optical signal generated in the transmission signal optical source to the wavelength of the protection channel, stored in the memory.

3. A coherent optical communication method comprising:

storing wavelength information of a protection channel in a memory;

detecting failure of a reception signal having a reception wavelength, the failure being detected by one of a plurality of demodulators;

outputting error information associated with the failure to a node controller in communication with the plurality of demodulators and a plurality of local oscillator light optical sources; and controlling, with the node controller, a local oscillator light optical source corresponding to the one of the plurality of demodulators, based on the error information so that a wavelength of local oscillator light generated in the local oscillator light optical source in order to demodulate the reception signal is changed to a wavelength of the protection channel, the wavelength of the protection channel being different from the reception wavelength.

4. The coherent optical communication method according to claim 3, further comprising:

controlling a transmission signal optical source so that a wavelength of the transmission signal optical source that generates an optical signal used for modulating a transmission signal is changed to the wavelength of the protection channel, stored in the memory.

* * * * *